United States Patent
Park et al.

(10) Patent No.: US 6,954,967 B2
(45) Date of Patent: Oct. 18, 2005

(54) STRUCTURE OF HANDGRIP AND METHOD FOR FABRICATION OF SAME

(75) Inventors: Seok Kyu Park, Changwon-shi (KR); Woong Kil Cha, Changwon-shi (KR); Myong Deok Kim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 10/380,956

(22) PCT Filed: Jul. 24, 2002

(86) PCT No.: PCT/KR02/01393
§ 371 (c)(1),
(2), (4) Date: Mar. 21, 2003

(87) PCT Pub. No.: WO03/009724
PCT Pub. Date: Feb. 6, 2003

(65) Prior Publication Data
US 2004/0022988 A1 Feb. 5, 2004

(30) Foreign Application Priority Data

| Jul. 24, 2001 | (KR) | .................................... | 2001-0044498 |
| Oct. 26, 2001 | (KR) | .................................... | 2001-0066283 |
| Dec. 18, 2001 | (KR) | .................................... | 2001-0080764 |
| Dec. 27, 2001 | (KR) | .................................... | 2001-0086242 |
| Jul. 10, 2002 | (KR) | .................................... | 2002-0039976 |

(51) Int. Cl.[7] .......................... B29C 45/16; B32B 1/04
(52) U.S. Cl. .......................... 16/412; 428/68; 264/255
(58) Field of Search .................. 428/34.1, 35.7, 428/40.8, 195.1, 543, 68, 76, 918; 16/110.1, 412, 413, 421, 422, 431, 436, 444, DIG. 18; 264/255, 132, 245, 512

(56) References Cited

U.S. PATENT DOCUMENTS

| 3,656,594 | A | * | 4/1972 | Marks et al. ................. 16/408 |
| 4,351,786 | A | * | 9/1982 | Mueller ..................... 264/46.7 |
| 5,920,943 | A | * | 7/1999 | Barker ....................... 15/143.1 |
| 6,052,885 | A | * | 4/2000 | Carmien ...................... 29/428 |
| 6,473,939 | B1 | * | 11/2002 | Stegmaier .................... 16/436 |
| 6,531,212 | B2 | * | 3/2003 | Owusu et al. ............. 428/323 |
| 6,726,868 | B1 | * | 4/2004 | Panfili et al. ............... 264/247 |
| 2002/0165032 | A1 | * | 11/2002 | Russell ....................... 464/179 |
| 2003/0150073 | A1 | * | 8/2003 | Jang ........................... 15/143.1 |

FOREIGN PATENT DOCUMENTS

| EP | 0849421 | 6/1998 |
| JP | 1202543 | 8/1989 |
| JP | 9154652 | 6/1997 |
| JP | 09-154652 A | 6/1997 |
| JP | 11-208277 | 8/1999 |
| JP | 11244174 | 9/1999 |
| JP | 2000356053 | 12/2000 |

* cited by examiner

*Primary Examiner*—Robert J. Sandy
*Assistant Examiner*—Andre L. Jackson
(74) *Attorney, Agent, or Firm*—McKenna Long & Aldridge LLP

(57) ABSTRACT

New form of handgrip for various home appliances, and method for fabricating the same, including a core 2 with decorative color, and a transparent outer shell 3 for enclosing the core 2, thereby solving problems of the present handgrip of peeling off of coating, and damage to carved, or relieved figures, or characters, and providing an outer look distinctive from the present handgrip.

25 Claims, 24 Drawing Sheets transparent resin

STRUCTURE OF HANDGRIP AND METHOD FOR FABRICATION OF SAME

TECHNICAL FIELD

The present invention relates to a structure of a handgrip applicable to various home appliances and a method for fabricating the same, and more particularly, to a structure of a handgrip applicable to various home appliances, such as laundry, refrigerator, microwave range and so on, and door of vehicle, etc., and a method for fabricating the same.

BACKGROUND ART

FIG. 1 is an exemplary view of a conventional handgrip that is mainly applied to door or cover of home appliances. In order to fabricate the conventional handgrip, a mold having a desired handgrip-shaped cavity is fabricated and resin is then injected into the cavity to form a handgrip. After that, the formed handgrip 1a is subject to a coating treatment of the surface thereof for the purpose of high grade of its external appearance.

Meanwhile, in recent years, in addition to the function of a product, the sense of beauty in external appearance has settled down as a very important element for market demand of products. Accordingly, product manufacturers pay their special endeavors to the enhancement of whole or partial sense of beauty.

In the light of this trend, the handgrip applied to various home appliances is also fabricated in various forms considering whole sense of beauty of product along with functional aspect, but the conventional handgrip structure and the manufacturing method thereof does not advance the function and sense of beauty of the handgrip in a remarkable form anymore. In other words, the handgrip 1a fabricated by the conventional method is generally coating-treated through a spraying method onto the surface thereof, which may cause a problem in that the coated film peels off due to its repeated usage by user or is decolored after usage of its long term to impede the sense of beauty.

In particular, the conventional handgrip has a drawback in that its painted surface is very weak to contact with chemicals, such as cosmetics and so on.

Meanwhile, in case character or figure is carved or relieved on the surface of the handgrip 1a, there may occur a disadvantage in that the surface is worn due to contact and collision with other articles caused by a long term usage, so that character or figure loses its original shape.

In other words, in case of being carved, foreign particles are smeared in grooves of the surface, whereas in case of being relieved, fracture or friction of the surface may occur due to collision with other articles, so that the carved character or figure loses its original shape and becomes dirty, thereby injuring beauty on appearance.

DISCLOSURE OF THE INVENTION

Accordingly, the present invention is directed to a handgrip structure and a method for fabricating the same that substantially obviate one or more of the problems due to limitations and disadvantages of the related art.

An object of the present invention is to provide a new structure of a handgrip and a method for fabricating the same in which a problem in that coating peels off and a problem in that carved or relieved figure or character is damaged are solved, thereby capable of developing the beauty on appearance of the handgrip differentially from a conventional one.

Another object of the present invention is to provide a structure of a handgrip and a method for fabricating the same in which it is possible to develop beauty on appearance of the handgrip differentially from a conventional one, and weight thereof decreases to make it easy to handle it.

A further another object of the present invention is to provide a structure of a handgrip and a method for fabricating the same in which in the handgrip structure in which a problem in that coating peels off, or a problem in that relieved or carved character or figure is damaged is solved, and it is possible to develop beauty on appearance of the handgrip differentially from a conventional one, a phenomenon in that it takes a long time in filling resin in a shell forming process, a phenomenon in that resin is not filled, and a phenomenon in that a weld line is formed are solved, and a problem in that an adhesive force between core surface as treated and shell is insufficient and thus a space is created between the core and the shell, and a scratch problem occurring when the shell is a soft material, can be solved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, there is provided a handgrip comprising a colored core and a transparent shell covering the core.

According to a second aspect of the invention, there is provided a method for fabricating a handgrip, said method comprising the steps of: injecting a resin into a cavity of a mold for forming a core to form a core; extracting the formed core from the core forming mold; loading the core extracted from the core forming mold into a shell forming mold having a cavity that is larger in volume than the core; injecting a transparent resin into the cavity of the shell forming mold to form a shell covering the core; extracting the handgrip comprised of the core and the shell covering the core from the shell forming mold.

According to a third aspect of the invention, there is provided a handgrip comprising a colored core having a cavity therein and a transparent shell covering the core.

According to a fourth aspect of the invention, there is provided a method for fabricating a handgrip, said method comprising the steps of: injecting a resin into a cavity of a mold for forming a core; blowing a gas into an interior of the core to form the core having a cavity therein; extracting the formed core from the core forming mold; loading the core extracted from the core forming mold into a shell forming mold having a cavity that is larger in volume than the core; injecting a transparent resin into the cavity of the shell forming mold to form a shell covering the core; extracting the handgrip comprised of the core and the shell covering the core from the shell forming mold.

According to a fifth aspect of the invention, there is provided a handgrip comprising a colored core having a cavity therein and a transparent shell covering the core.

According to a sixth aspect of the invention, there is provided a method for fabricating a handgrip, said method comprising the steps of: injecting a resin into a cavity of a mold for forming a core; blowing a gas into an interior of the core to form the core having a cavity therein and a coupling boss at both ends thereof; extracting the formed core from the core forming mold; loading the core extracted from the core forming mold into a shell forming mold having a cavity that is larger in volume than the core; injecting a transparent resin into the cavity of the shell forming mold to form a shell covering the core; extracting the handgrip comprised of the core and the shell covering the core from the shell forming mold.

According to a seventh aspect of the invention, there is provided a handgrip comprising a colored core having a concaved groove formed wholly along a length direction at a lower surface thereof, and a transparent shell covering the core.

According to an eighth aspect of the invention, there is provided a method for fabricating a handgrip, said method comprising the steps of: injecting a resin into a cavity of a mold for forming a core to form the core having a color and a concaved groove formed wholly along a length direction at a lower surface thereof; extracting the formed core from the core forming mold; loading the core extracted from the core forming mold into a shell forming mold having a cavity that is larger in volume than the core; injecting a transparent resin into the cavity of the shell forming mold to form a shell covering the core; extracting the handgrip comprised of the core and the shell covering the core from the shell forming mold.

According to a ninth aspect of the invention, there is provided a method for fabricating a handgrip, said method comprising the steps of: molding a core having a predetermined curvature; loading the core into a shell forming mold having a cavity that is larger in volume than the core; and injecting a transparent resin into the cavity of the shell forming mold to form a shell covering the core, wherein a gate of the shell forming mold is located prior to performing the step of forming the shell at a position forming a thick leaf portion after completion of the forming of the shell.

At this time, the gate of the shell forming mold is formed preferably declined by a predetermined angle with respect to a horizontal plane, and more preferably, declined along a tangent direction drawn to pass through one end of the gate and be in contact with an upper surface of the core.

Meanwhile, prior to loading the molded core into the shell forming mold, a surface treatment for coloring a surface of the core is carried out.

At this time, the surface treatment includes the steps of: covering a predetermined region of the core with a mask so as to define the predetermined region where a colored layer should not be formed; forming the colored layer except for the predetermined region covered with the mask; and removing the mask.

Meanwhile, after the molding of the shell, if the shell is of a soft material such as Surlyn or the like, a glossy wax is coated on the surface of the shell.

According to the handgrips of the invention having the above constructions, there is solved a problem of the conventional handgrip in that coating peels off, or relieved or carved figure or character is damaged, and it becomes possible to develop beauty of the handgrip on appearance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8b is a front view of FIG. 8a;

FIG. 16b is a front view of FIG. 16a;

FIG. 24b is a front view of FIG. 24a;

DESCRIPTION OF REFERENCE NUMERALS IN MAIN PORTIONS OF THE DRAWINGS

| 1: | Handgrip | 2: | Core |
|---|---|---|---|
| 200: | Clamping rib | 210: | Supporting rib |
| 220: | Concaved portion | 230: | Reinforcing rib |
| 240a, 240b: | Coupling boss | | |
| 250: | Cavity part | 260: | Concaved groove |
| 3: | Shell | 4: | Shell forming mold |
| 4a: | Upper mold | 4b: | Lower mold |
| 40: | Shell forming mold | | |
| 40a: | Upper mold | 40b: | Lower mold |
| 410: | Gate | 500: | Masking region |

BEST MODE FOR CARRYING OUT THE INVENTION

Reference will now be made in detail to the preferred embodiments of the present invention, examples of which are illustrated in the accompanying drawings of FIGS. 2 to 33.

First, a handgrip structure and a fabrication method thereof according to a first embodiment of the present invention will be described with reference to FIGS. 2 to 9.

Figure 1:
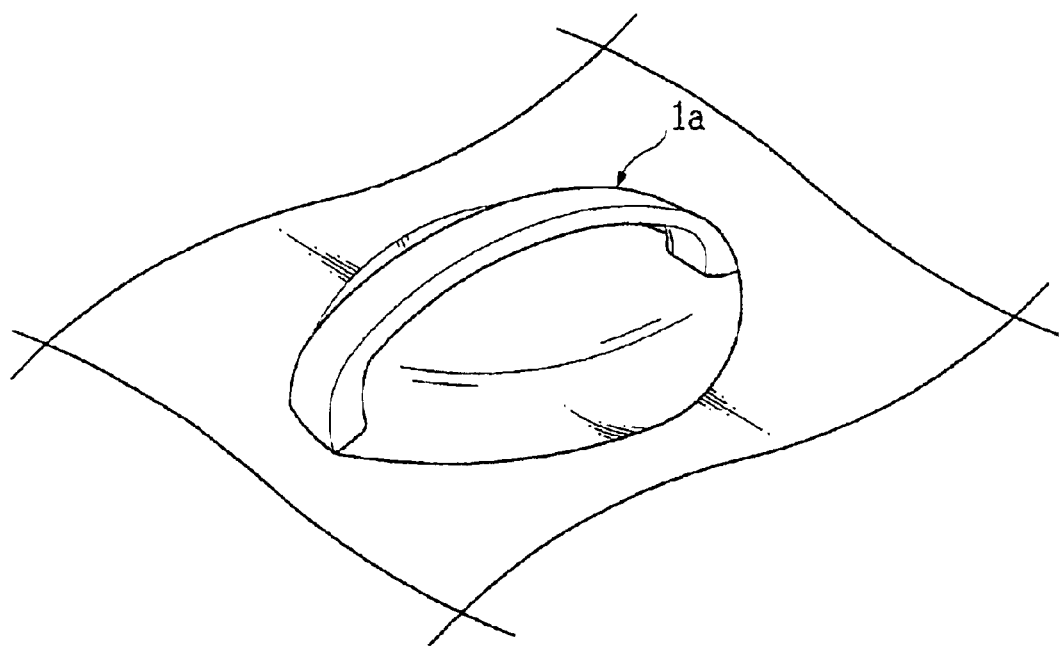
FIG. 1 is a perspective view of a handgrip applied to home appliances or the like according to the conventional art.
Figure 2:
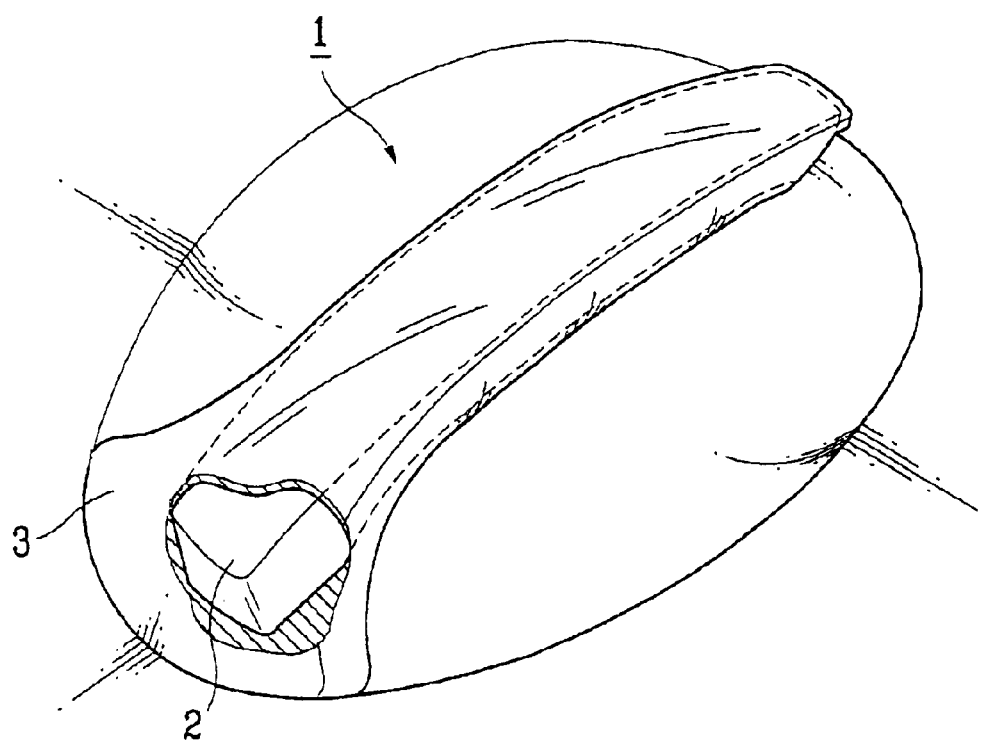
FIG. 2 is a perspective view showing one application example of a handgrip structure according to an embodiment of the present invention.
Figure 3:
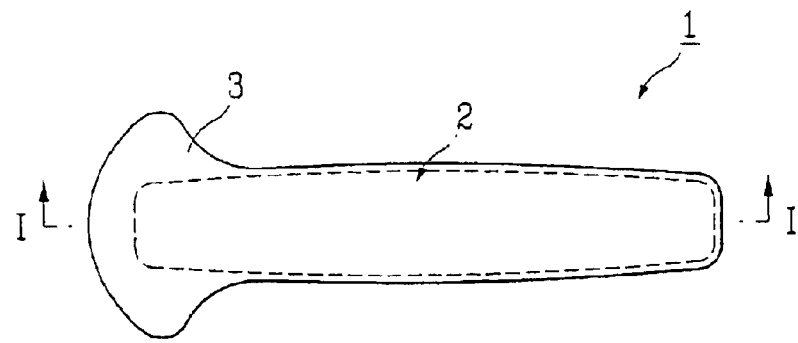
FIG. 3 is a plan view of a handgrip according to a first embodiment of the present invention.
Figure 4:
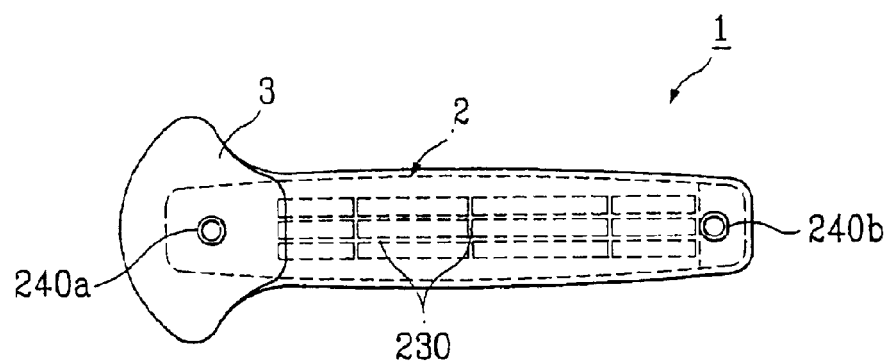
FIG. 4 is a bottom view of FIG. 3.
Figure 5:
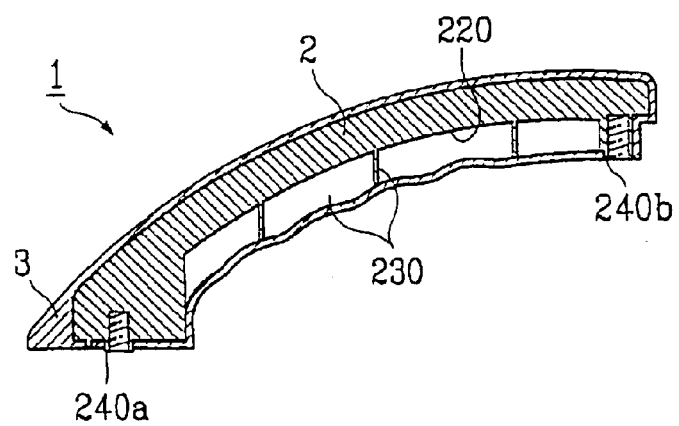
FIG. 5 is a longitudinal sectional view taken along the line I—I of FIG. 3.
Figure 6:
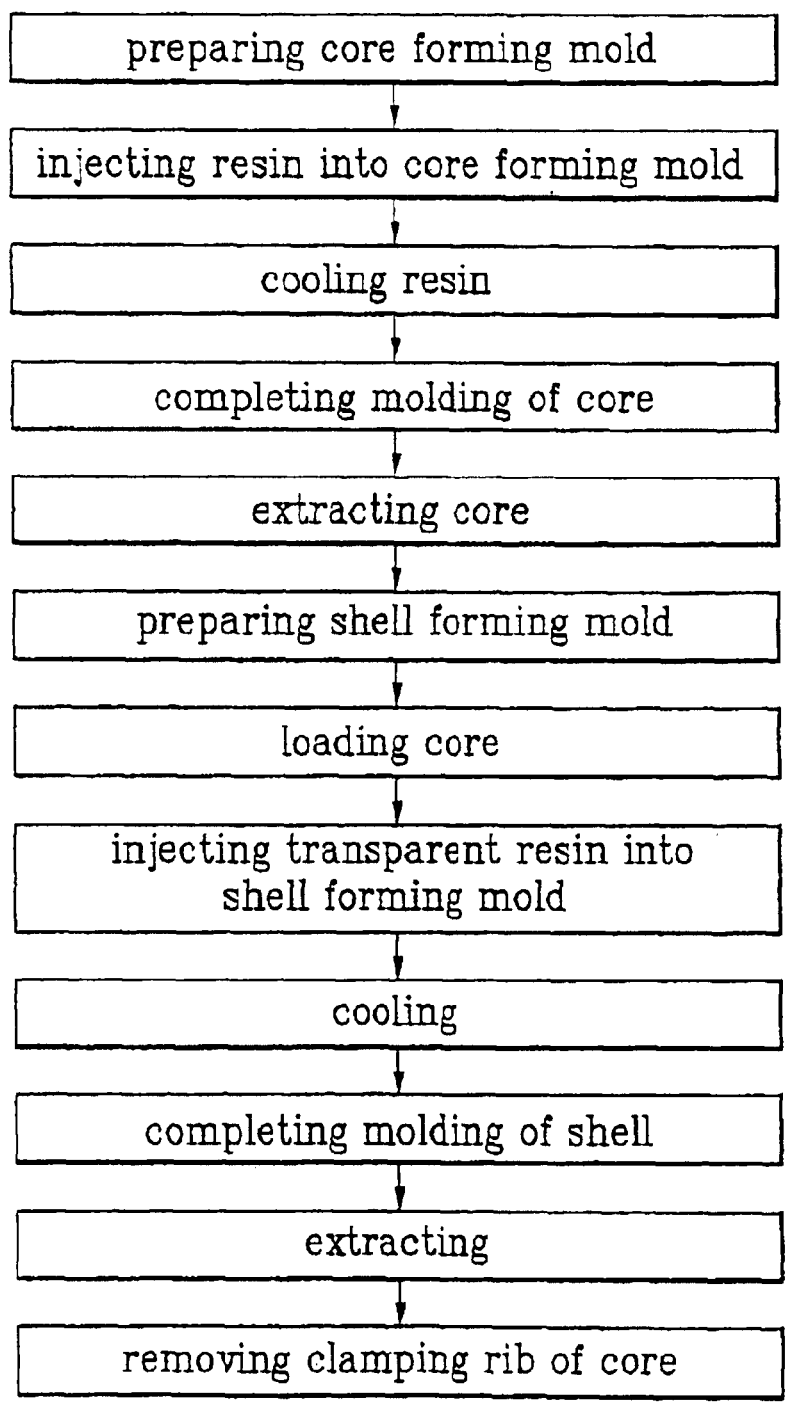
FIG. 6 is a flow chart showing a fabrication procedure of a handgrip according to a first embodiment of the present invention.

FIG. 2 is a perspective view showing one application example of a handgrip structure according to an embodiment of the present invention, FIG. 3 is a plan view of a handgrip according to a first embodiment of the present invention, FIG. 4 is a bottom view of FIG. 3, and FIG. 5 is a longitudinal sectional view taken along the line I—I of FIG. 3.

A handgrip 1 according to a first embodiment of the present invention includes a colored core 2, and a transparent shell 3 covering the core 2.

The core 2 is preferably made in a bar type. In case of the bar type core, it is more preferably that the core 2 has a predetermined curvature along a selected direction for an easy grip.

At least one of both ends of the core 2 is a streamline shape, and at least one of both ends of the shell 3 may be a streamline shape.

At least one end of the shell 3 may be a fan shape as it travels to both ends. Especially, a portion corresponding to both oblique sides of the fan shape is preferably inwardly curved for an easy grip.

In other words, in the fan shape structure of the shell 3, in case the portion corresponding to both oblique sides is inwardly curved, when looking at the grip of the handgrip 1 according to the first embodiment of the present invention from the ergonomic point of view, the handgrip is well harmonized with shape of side palm as fisted and shape of thumb or middle finger, thereby making a role in increasing grip force for the handgrip 1 and helping to easily grip the handgrip 1.

For saving material and forming time, and preventing a contraction phenomenon upon forming the handgrip, it is desirous that a concaved portion 220 is formed on a lower surface of the core 2. In this case, a reinforcing rib for the enhancement of strength is preferably provided in the concaved portion 220 on the lower surface of the core 2.

The reason is to prevent the core 2 from being deformed by transparent resin that is injected at high speed and high pressure for the formation of the shell 3. The reinforcing rib 230 maybe formed in various shapes, for instance, lattice shape.

Figure 7:
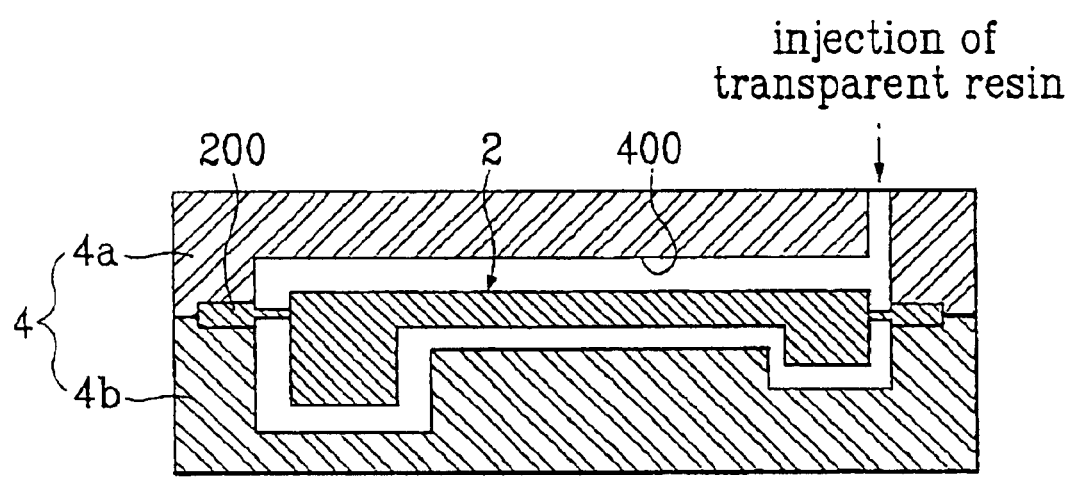
FIG. 7 is a schematic view showing a state in which a core is loaded into a mold.
Figure 8A:
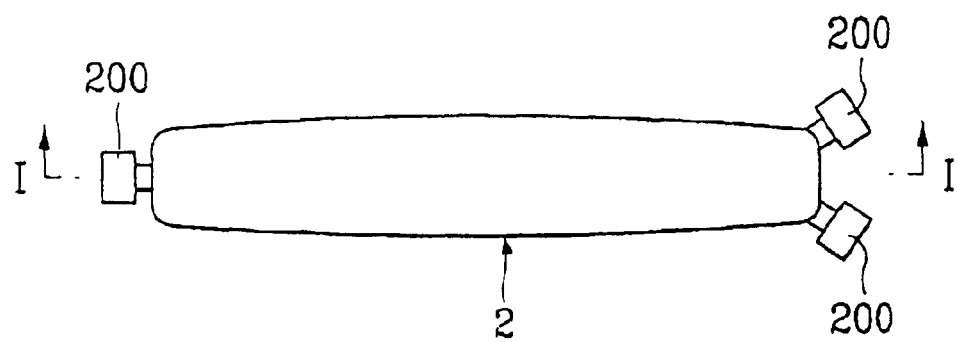
FIG. 8a is a plan view of the core shown in FIG. 7.
Figure 8B:
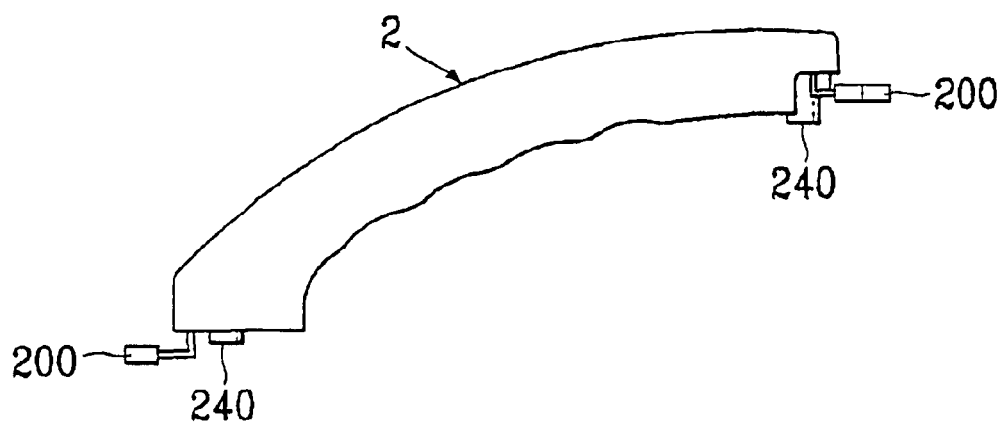

Meanwhile, FIG. 7 schematically shows a state in which a core 2 having a clamping rib 200 formed at both ends thereof is loaded into a mold, FIGS. 8a and 8b are respectively a plan view and a front view of the core shown in FIG. 7. The core 2 includes the clamping rib 200 which when the core is loaded into a mold for the formation of shell, allows the core to be supported by the mold. It is preferable that the clamping rib 200 is respectively provided at both ends of the core 2, in particular at a lower side of the both ends of the core 2 so as to be clamped between an upper mold 4a and a lower mold 4b. Why the clamping rib 200 is provided at the lower side of the both ends of the core 2 is, in case of removing the clamping rib 200 after the formation of the shell, to get rid of the trace that the clamping rib 200 was placed.

Figure 9:
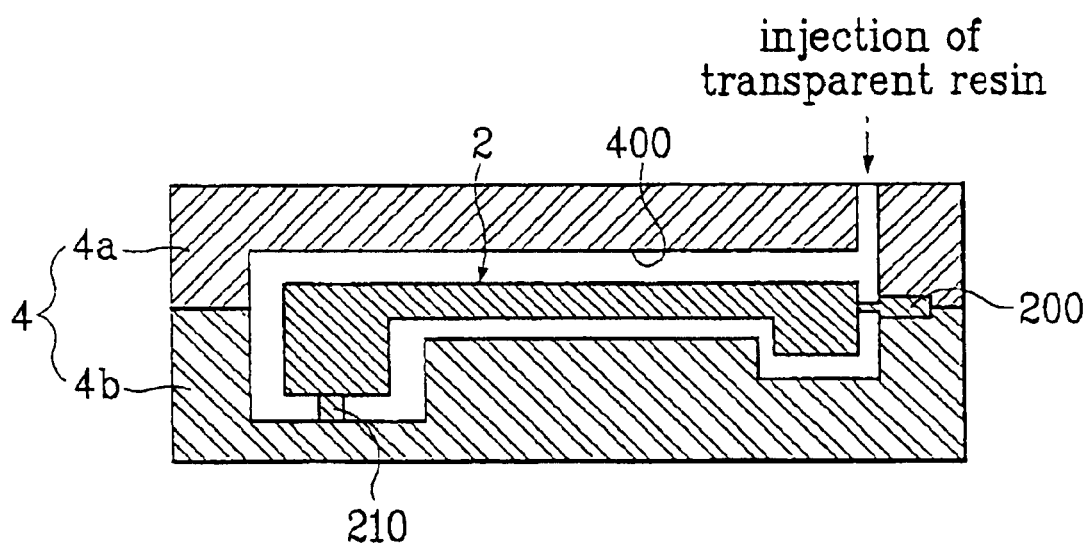
FIG. 9 is a schematic view of a state in which a core is loaded into a mold according to another embodiment of the present invention.

FIG. 9 is a schematic view of a state in which a core is loaded into a mold according to another embodiment of the present invention, and corresponds to a case in which a clamping rib 200 is formed at one end portion of the core 2, and a supporting rib 210 is formed on a bottom surface of the other end. The supporting rib 210 is, when the core is loaded into a shell forming mold 4, in contact with a bottom surface of a cavity of a lower mold.

In other words, at the bottom surface of at least one end portion of the both end portions of the core 2 is formed the supporting rib 210, when the core is loaded into the shell forming mold 4, in contact with a bottom surface of a cavity of a lower mold 4b.

Naturally, in this case, a mold designed differently than that shown in FIG. 7 is used.

Meanwhile, a metal layer may be formed on the surface of the core 2. At this time, the metal layer is formed by a plating method or a sputtering deposition.

Simultaneously, a color may be added to the shell 3 so as to maintain transparency of the shell 3 and beautify the appearance. In other words, the shell 3 may be formed from a transparent resin that has a color but does not weaken or harm the transparency and at the same time beautifies the appearance.

Preferably, the core 2 has a material property of which melting point is higher than that of the shell 3. More specifically, it is desirous that the melting point of the core 2 is 200° C. or more and the melting point of the shell 3 is below 150° C.

Also, the core is of a material having impact-resistant, high strength, high fluidity, high gloss and high plating-adhering strength. For example, the core is of Nylon, PC (Polycarbonate) or the like.

Meanwhile, the shell 3 is of a material having impact-resistant, high strength, high fluidity, fire retardancy, heat-resistant, chemical-resistant, corrosion-resistant and charging-preventing properties. In order to satisfy these conditions, the shell is of ABS, PMMA, Surlyn, ASA, ALPHALAC or the like.

A character or figure may be carved or relieved on the surface of the core 2. In this case, the character or figure carved or relieved on the surface of the core 2 is the transparent shell 3 and thus is recognizable from an outside, and since a contact of the character or figure with other article is prevented, there exists an advantage in that the character or figure loses its original shape.

Meanwhile, the core 2 may be formed of metal, which is to prepare in case a weight or a very high strength necessary for the handgrip is requested.

Also, it is desirous that the core 2 or the lower surface of the shell 3 has a dimple structure such that it is easy to grip the handgrip.

Further, the handgrip 1 according to the first embodiment of the invention is molded to have a coupling boss 240a, 240b. Accordingly, the handgrip 1 is screw-coupled with a door, or a coupling hole is directly processed on the bottom surface after molding thereof, and then it is screw-coupled with a door or the like. In case the supporting rib 210 is placed at the lower surface of both ends of the core 2, the coupling hole may be processed on the supporting rib 210.

A method for fabricating a handgrip having the above structure according to the first embodiment of the present invention is described with reference to FIGS. 6 to 9.

First, a mold (not shown) for forming a core is prepared and a melted resin having a color is injected into the core forming mold at a high speed and a high pressure. In other words, the core is formed by an injection molding that is a representative of plastic processing methods and is widely used in processing plastic products having a complicated shape.

At this time, the core forming mold is designed to be provided, at an outer side thereof when the core has been formed, with a clamping rib 200 that is clamped by a mold 4 for forming a shell.

Meanwhile, after the injection of the melted resin into the cavity of the core forming mold, the injected resin is cooled.

After the resin has been cooled, the core forming mold is opened and the formed core 2 is extracted from the core forming mold.

Next, the core 2 extracted from the core forming mold is loaded into a shell forming mold 4 having a cavity 400 that is larger in volume than the core 2. At this time, the clamping rib 200 of the core 2 is clamped by an upper mold 4a and a lower mold 4b to be supported, so that a space part is formed between the core 2 loaded into the shell forming mold 4 and the inner wall of the cavity 400 of the shell forming mold.

As above, after the core 2 has been loaded into the shell forming mold 4, the melted resin is injected into the cavity 400 of the shell forming mold 4 at a high speed and a high pressure, and after the completion of the injection, the injected transparent resin is cooled.

After the completion of the cooling, a handgrip including the core 2 and the shell 3 covering the core 2 is extracted from the shell forming mold 4.

Thereafter, the clamping rib 200 formed on the outer surface of the core 2 of the extracted handgrip is removed, so that only the core 2 and the shell 3 remain.

In other words, since the clamping rib 200 is formed at a lower side of one end of the core 2, when the handgrip from which the clamping rib 200 is removed is installed in a door or the like as shown in FIG. 2, a trace of the clamping rib 200 does not remain, so that appearance of the handgrip is beautified.

Meanwhile, in case a supporting protrusion is downwardly formed at the bottom surface of one end of the core and clamping rib 200 is arranged at the other end of the core, a trace of the clamping rib 200 or the supporting protrusion is not shown on appearance likewise.

In the aforementioned fabrication method of the handgrip 1 according to the first embodiment of the present invention, the core may be fabricated by blow molding.

Also, after the completion of the forming of the core 2, prior to loading the core 2 into the shell forming mold 4, the step of carving or relieving a character or figure on the surface of the formed core 2 may be further included.

Separately, after the completion of the forming of the core 2, a metal layer may be formed on the surface of the core 2, which is formed by a plating or a sputtering deposition.

Further, the core 2 applied to the fabrication method of the handgrip according to the first embodiment of the present invention is made of a material of which melting point should be 200° C. or more and the melting point of the shell should be below 150° C.

Furthermore, the core 2 is preferably of a material having impact-resistant, high strength, high fluidity, high gloss and high plating-adhering strength properties. The material having the above properties of the core 2 includes Nylon and PC.

Moreover, the shell 3 is of a material having impact-resistant, high strength, high fluidity, fire retardancy, heat-resistant, chemical-resistant, corrosion-resistant and charging-preventing properties. The material having the above properties of the shell 3 includes ABS, PMMA, Surlyn, ASA and ALPHALAC.

Also, the shell 3 applied to the fabrication method of the handgrip according to the first embodiment of the present invention is a transparent resin that has a color but does not weaken or harm the transparency and at the same time beautifies the appearance.

Next, a second preferred embodiment of the invention will be now described in detail with reference to the accompanying drawings of FIG. 2 and FIGS. 10 to 17.

Figure 10:
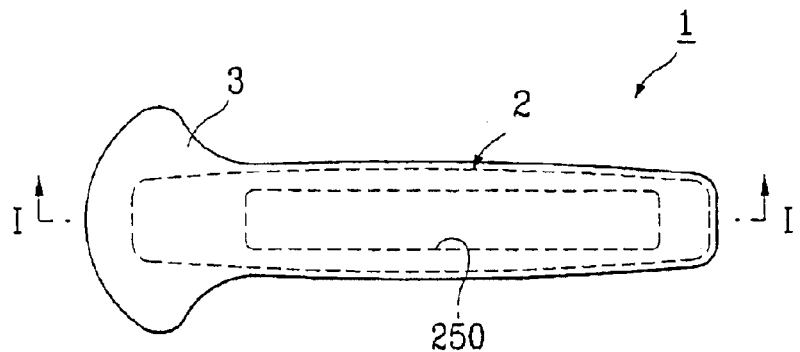
FIG. 10 is a plan view of a handgrip according to a second embodiment of the present invention.
Figure 11:
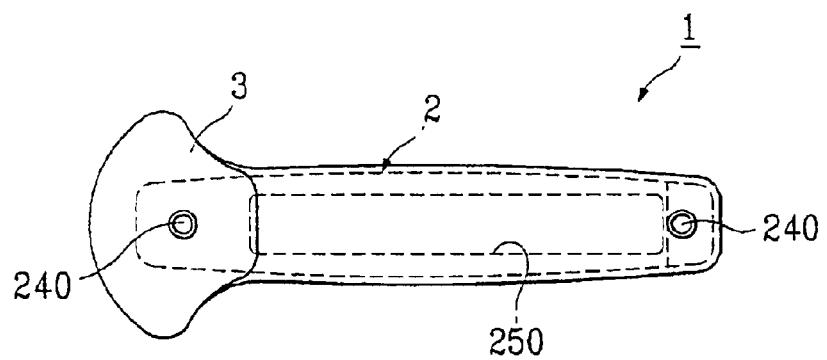
FIG. 11 is a bottom view of FIG. 10.
Figure 12:
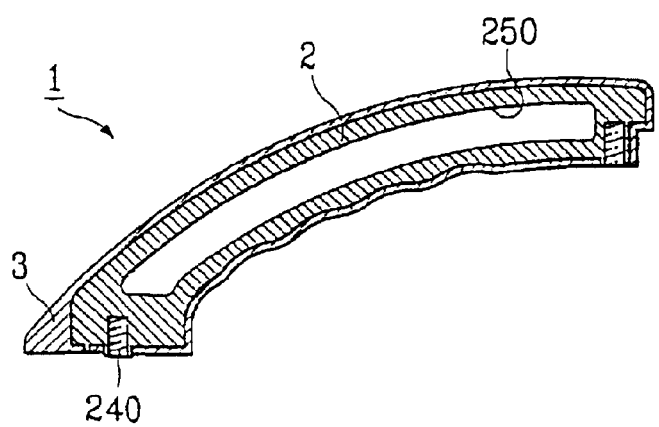
FIG. 12 is a longitudinal sectional view taken along the line I—I line.
Figure 13:
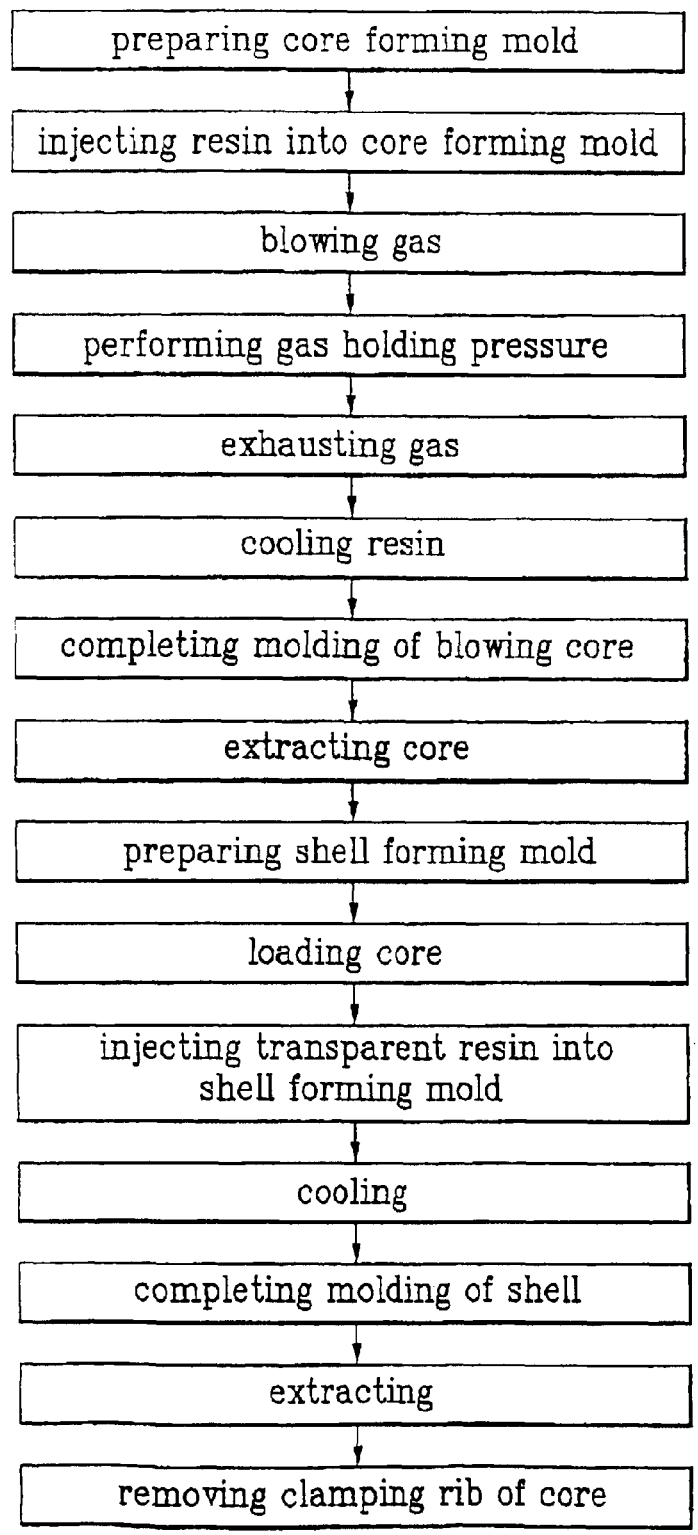
FIG. 13 is a flow chart showing a fabrication procedure of a handgrip according to a second embodiment of the present invention.
Figure 14:
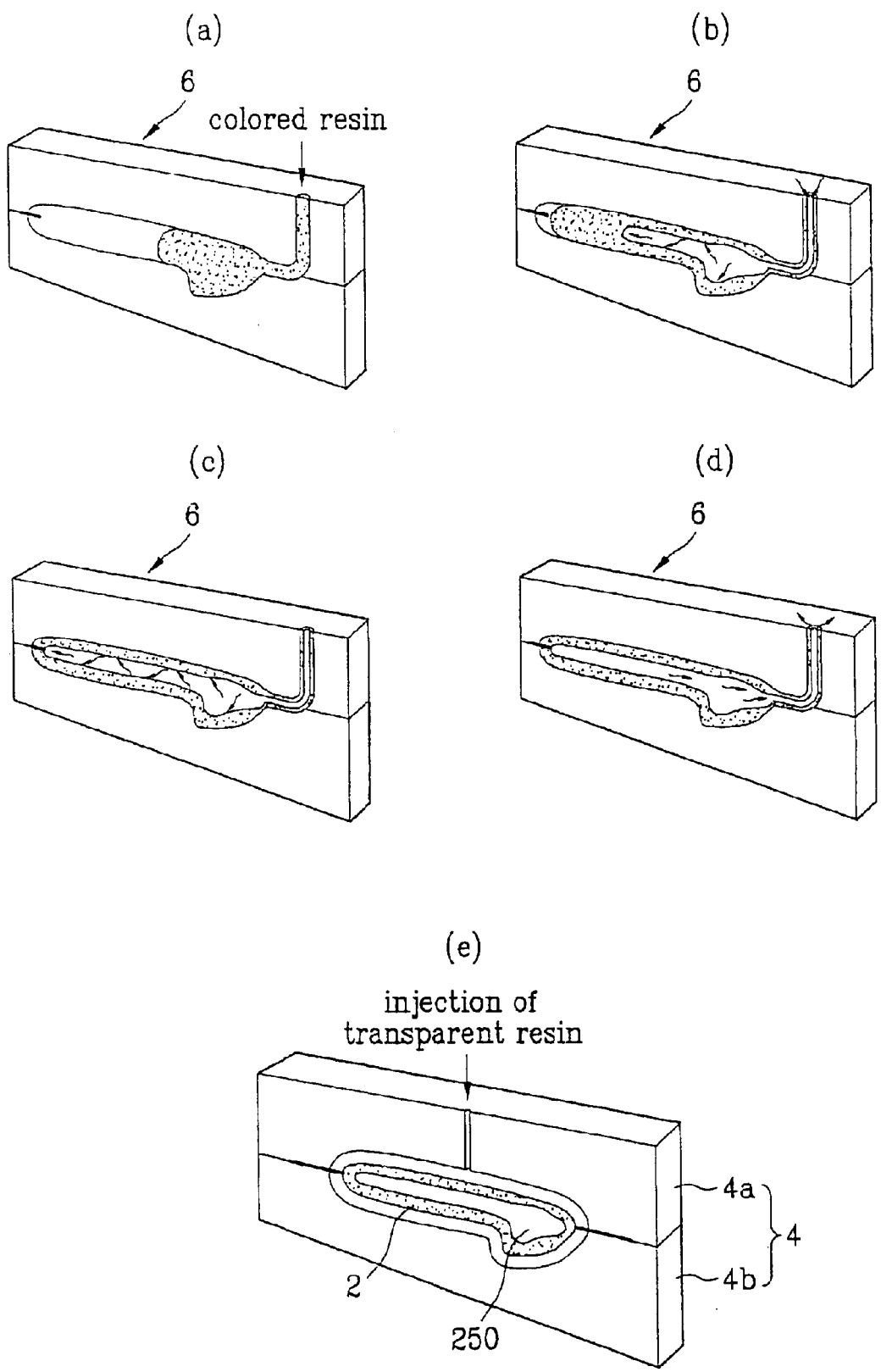
FIG. 14 is a view schematically showing the fabrication procedure of FIG. 13.

FIG. 2 is a perspective view showing one application example of a handgrip structure according to a second embodiment of the present invention, FIG. 10 is a plan view of a handgrip according to a second embodiment of the present invention, FIG. 11 is a bottom view of FIG. 10, and FIG. 12 is a longitudinal sectional view taken along the line I—I line.

A handgrip 1 according to a second embodiment of the present invention includes a colored core 2 having a cavity therein, and a transparent shell covering the core 2. The core 2 is preferably made in a bar type. In case of the bar type core, it is more preferably that the core 2 has a predetermined curvature along a selected direction for an easy grip.

At least one of both ends of the core 2 is a streamline shape, and at least one of both ends of the shell 3 may be a streamline shape.

At least one end of the shell 3 may be a fan shape as it travels to both ends. Especially, a portion corresponding to both oblique sides of the fan shape is preferably inwardly curved for an easy grip.

In other words, in the fan shape structure of the shell 3, in case the portion corresponding to both oblique sides is inwardly curved, when looking at the grip of the handgrip according to the second embodiment of the present invention from the ergonomic point of view, the handgrip is well harmonized with shape of side palm as fisted and shape of thumb or middle finger, thereby making a role in increasing grip force for the handgrip 1 and helping to easily grip the handgrip 1.

Figure 15:
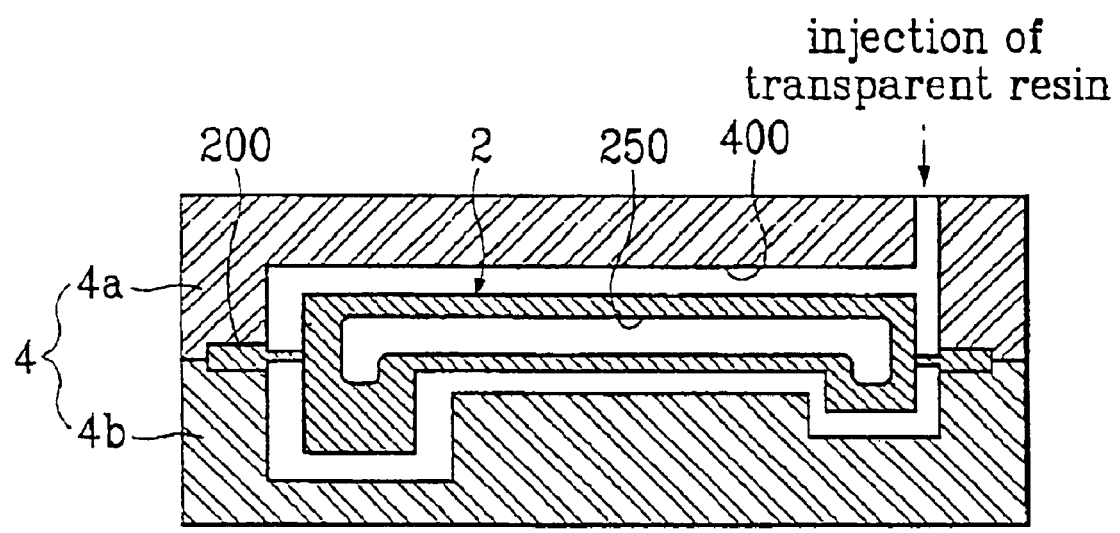
FIG. 15 is a schematic view showing a state in which a core is loaded into a mold.
Figure 16A:
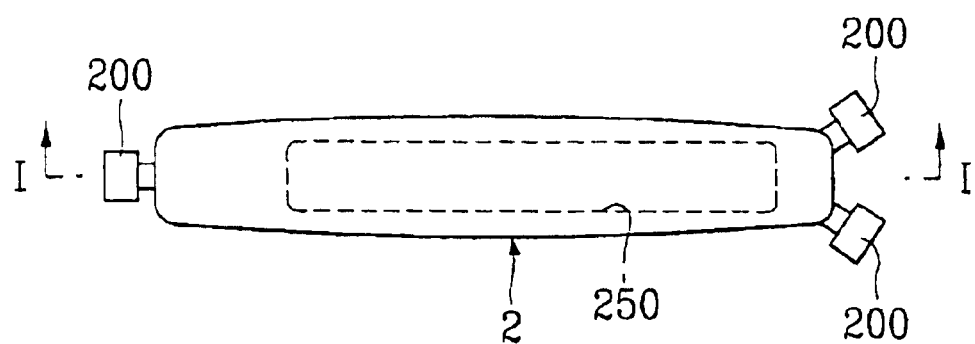
FIG. 16a is a plan view of the core shown in FIG. 15.
Figure 16B:
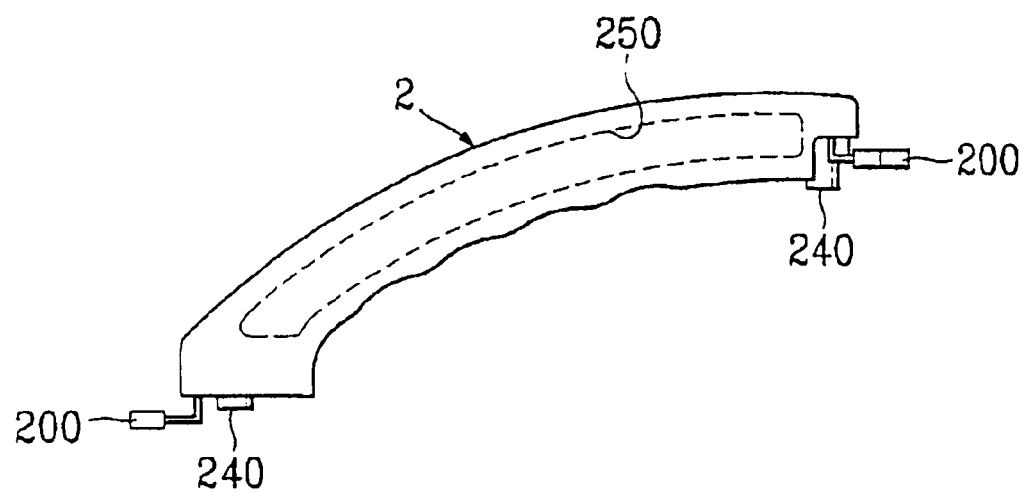

Meanwhile, FIG. 15 is a schematic view showing a state in which the core 2 having a clamping rib 200 formed at both ends is loaded into a mold, FIGS. 16a and 16b are respectively a plan view of the core shown in FIG. 15 and a front view. The core 2 includes the clamping rib 200 which when the core 2 is loaded into a mold for the formation of shell, allows the core to be supported by the mold. It is preferable that the clamping rib 200 is respectively provided at both ends of the core 2, in particular at a lower side of the both ends of the core 2 so as to be clamped between an upper mold 4a and a lower mold 4b.

Why the clamping rib 200 is provided at the lower side of the both ends of the core 2 is, in case of removing the clamping rib 200 after the formation of the shell, to get rid of the trace that the clamping rib 200 was placed.

Figure 17:
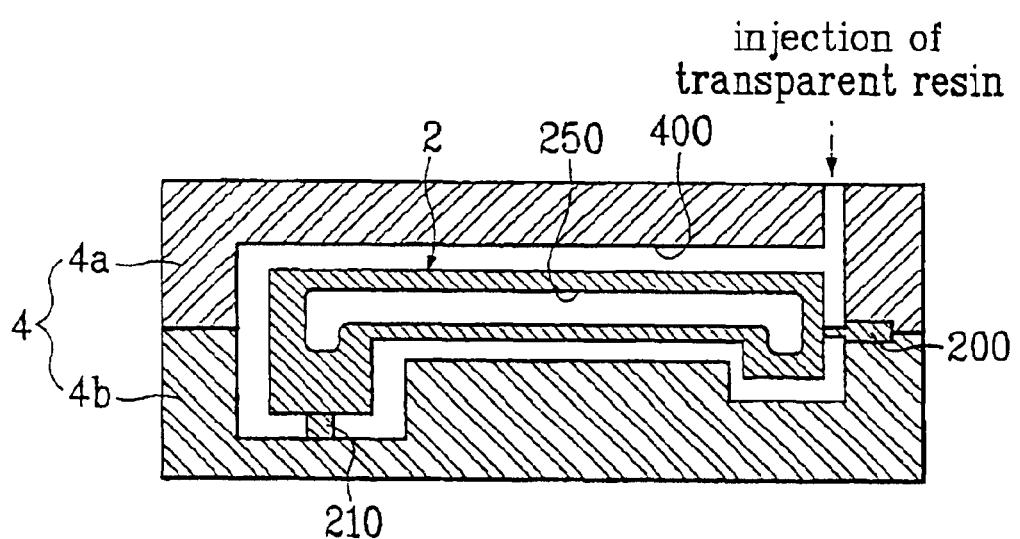
FIG. 17 is a schematic view showing a state in which a core is loaded into a mold according to another embodiment of the present invention.

FIG. 17 is a schematic view showing a state in which the core is loaded into a mold according to another embodiment of the present invention, and corresponds to a case in which a clamping rib 200 is formed at one end portion of the core 2, and a supporting rib 210 is formed on a bottom surface of the other end. The supporting rib 210 is, when the core is loaded into a shell forming mold 4, in contact with a bottom surface of a cavity 400 of a lower mold.

In other words, at the bottom surface of at least one end portion of the both end portions of the core 2 is formed the supporting rib 210, when the core is loaded into the shell forming mold 4, in contact with a lower mold 4b.

Naturally, in this case, a mold designed differently than that shown in FIG. 15 is used.

Meanwhile, a metal layer may be formed on the surface of the core 2. At this time, the metal layer is formed by a plating method or a sputtering deposition.

Simultaneously, a color may be added to the shell 3 so as to maintain transparency of the shell 3 and beautify the appearance. In other words, the shell 3 may be formed from a transparent resin that has a color but does not weaken or harm the transparency and at the same time beautifies the appearance.

Preferably, the core 2 has a material property of which melting point is higher than that of the shell 3. More specifically, it is desirous that the melting point of the core 2 is 200° C. or more and the melting point of the shell 3 is below 150° C.

Also, the core is of a material having impact-resistant, high strength, high fluidity, high gloss and high plating-adhering strength. An example of the core material for satisfying such conditions includes Nylon, PC (Polycarbonate) or the like.

Meanwhile, the shell 3 is of a material having impact-resistant, high strength, high fluidity, fire retardancy, heat-resistant, chemical-resistant, corrosion-resistant and charging-preventing properties. In order to satisfy these conditions, the shell is of ABS, PMMA, Surlyn, ASA, ALPHALAC or the like.

A character or figure may be carved or relieved on the surface of the core 2.

Meanwhile, it may be desirous that the core 2 is heavy. In this case, the core 2 may be of metal.

Also, it is desirous that the core 2 or the lower surface of the shell 3 has a dimple structure such that it is easy to grip the handgrip.

Further, the handgrip 1 according to the second embodiment of the invention is molded to have a coupling boss 240a, 240b at both ends thereof. Accordingly, the handgrip 1 is screw-coupled with a door, or a coupling hole is directly processed on the bottom surface after molding thereof, and then it is screw-coupled with a door or the like. In case the supporting rib 210 is placed at the lower surface of both ends of the core 2, the coupling hole may be processed on the supporting rib 210.

A method for fabricating a handgrip having the above structure according to the second embodiment of the present invention is described with reference to FIGS. 13 to 17.

First, a mold 6 for forming a core is prepared and a melted resin having a color is injected into the core forming mold 6. (Refer to "(a)" of FIG. 14) In other words, the core is formed by an injection molding that is a representative of plastic processing methods and is widely used in processing plastic products having a complicated shape.

At this time, the core forming mold 6 may be designed to be provided, at an outer side thereof when the core has been formed, with a clamping rib 200 that is clamped by a mold 4 for forming a shell.

Meanwhile, after the injection of the melted resin into the cavity of the core forming mold 6 by a certain amount, a gas is injected into an interior of the melted resin to thereby expand the melted resin. (Refer to "(b) of FIG. 14)

Thereafter, the melted resin is cooled through a holding pressure process with preventing contraction of the resin. (Refer to "(c)" of FIG. 14) Thereafter, the gas is exhausted to complete the forming of the core having the hollow cavity for the handgrip. (Refer to "(d)" of FIG. 14)

In the holding pressure process that is carried out as the next process to the injection process of the melted resin inside the mold, a specific pressure is applied to the injection inlet of the resin, and in this state, cooling of the filled material is carried out along with an additive introduction of the resin by the pressing, so that it becomes possible to minimize non-uniform contraction causing warpage of product.

Meanwhile, after the molded core 2 is extracted, the extracted core 2 is loaded into a shell forming mold 4 having a cavity 400 that is larger in volume than the core 2 and an insertion injection is carried out to complete a handgrip. (Refer to "(e)" of FIG. 14) At this time, the clamping rib 200 of the core 2 is clamped by an upper mold 4a and a lower mold 4b to be supported, so that a space part is formed between the core 2 loaded into the shell forming mold 4 and the inner wall of the cavity 400 of the shell forming mold 4.

As above, after the core 2 has been loaded into the shell forming mold 4, the melted resin is injected into the cavity 400 of the shell forming mold 4 at a high speed and a high pressure, and after the completion of the injection, the injected transparent resin is cooled.

After the completion of the cooling, a handgrip including the core 2 and the shell 3 covering the core 2 is extracted from the shell forming mold 4.

Thereafter, the clamping rib 200 formed on the outer surface of the core 2 of the extracted handgrip is removed, so that only the core 2 and the shell 3 remain.

In other words, since the clamping rib 200 is formed at a lower side of one end of the core 2, when the handgrip from which the clamping rib 200 is removed is installed in a door or the like as shown in FIG. 2, a trace of the clamping rib 200 does not remain, so that appearance of the handgrip is beautified.

Meanwhile, in case a supporting protrusion is downwardly formed at the bottom surface of one end of the core and clamping rib 200 is arranged at the other end of the core, a trace of the clamping rib 200 or the supporting protrusion is not shown on appearance likewise.

Also, after the completion of the forming of the core 2, prior to loading the core 2 into the shell forming mold 4, the step of carving or relieving a character or figure on the surface of the formed core 2 may be further included.

Separately, after the completion of the forming of the core 2, a metal layer may be formed on the surface of the core 2, which is formed by a plating or a sputtering deposition.

Further, the core 2 applied to the fabrication method of the handgrip according to the second embodiment of the present invention is made of a material of which melting point should be 200° C. or more and the melting point of the shell should be below 150° C.

Furthermore, the core 2 is preferably of a material having impact-resistant, high strength, high fluidity, high gloss and high plating-adhering strength properties. The material having the above properties of the core 2 includes Nylon and PC.

Moreover, the shell 3 is of a material having impact-resistant, high strength, high fluidity, fire retardancy, heat-resistant, chemical-resistant, corrosion-resistant and charging-preventing properties. The material having the above properties of the shell 3 includes ABS, PMMA, Surlyn, ASA and ALPHALAC.

According to the second embodiment of the present invention, the resin may be a transparent resin that has a color but does not weaken or harm the transparency and at the same time beautifies the appearance.

Next, a third preferred embodiment of the invention will be now described in detail with reference to the accompanying drawings of FIGS. 18 to 24b.

Figure 18:
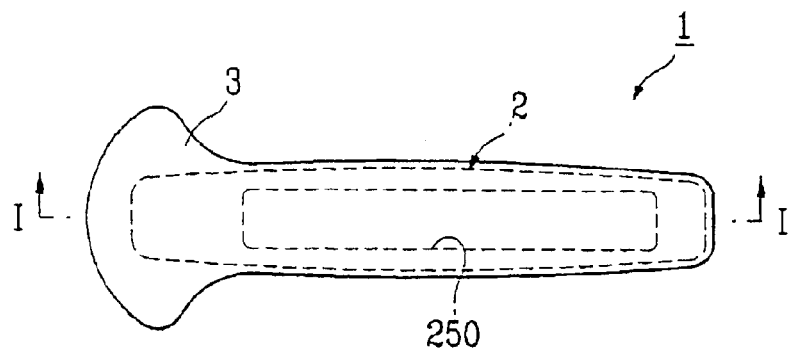
FIG. 18 is a plan view of a handgrip according to a third embodiment of the present invention.
Figure 19:
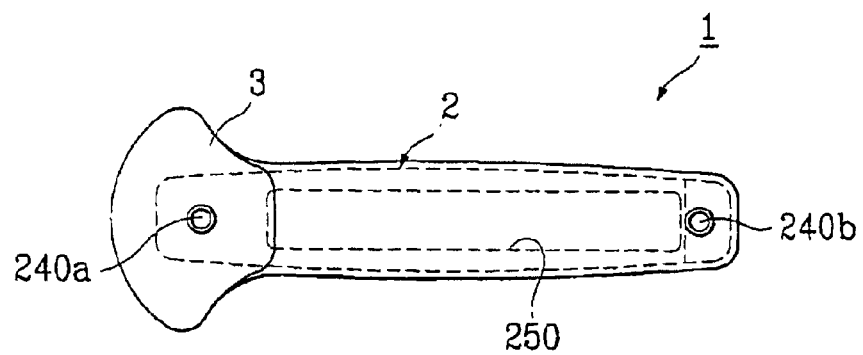
FIG. 19 is a bottom view of FIG. 18.
Figure 20:
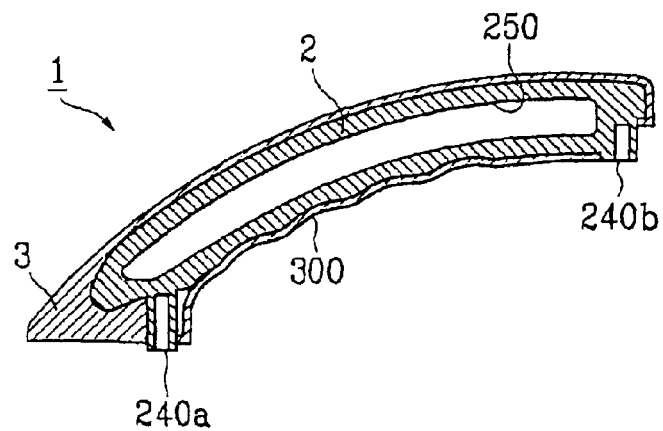
FIG. 20 is a longitudinal sectional view taken along the line I—I of FIG. 18.
Figure 21:
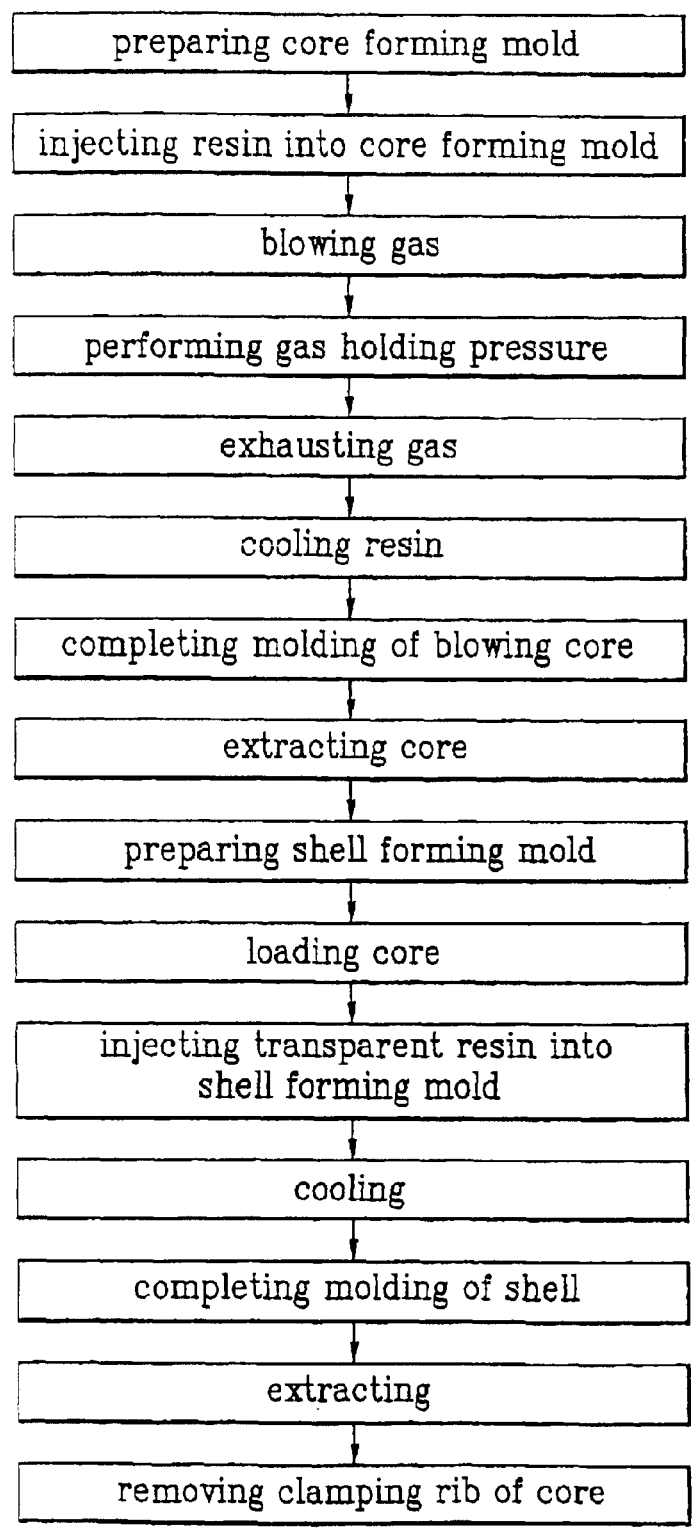
FIG. 21 is a flow chart showing a fabrication procedure of a handgrip according to a third embodiment of the present invention.
Figure 22:
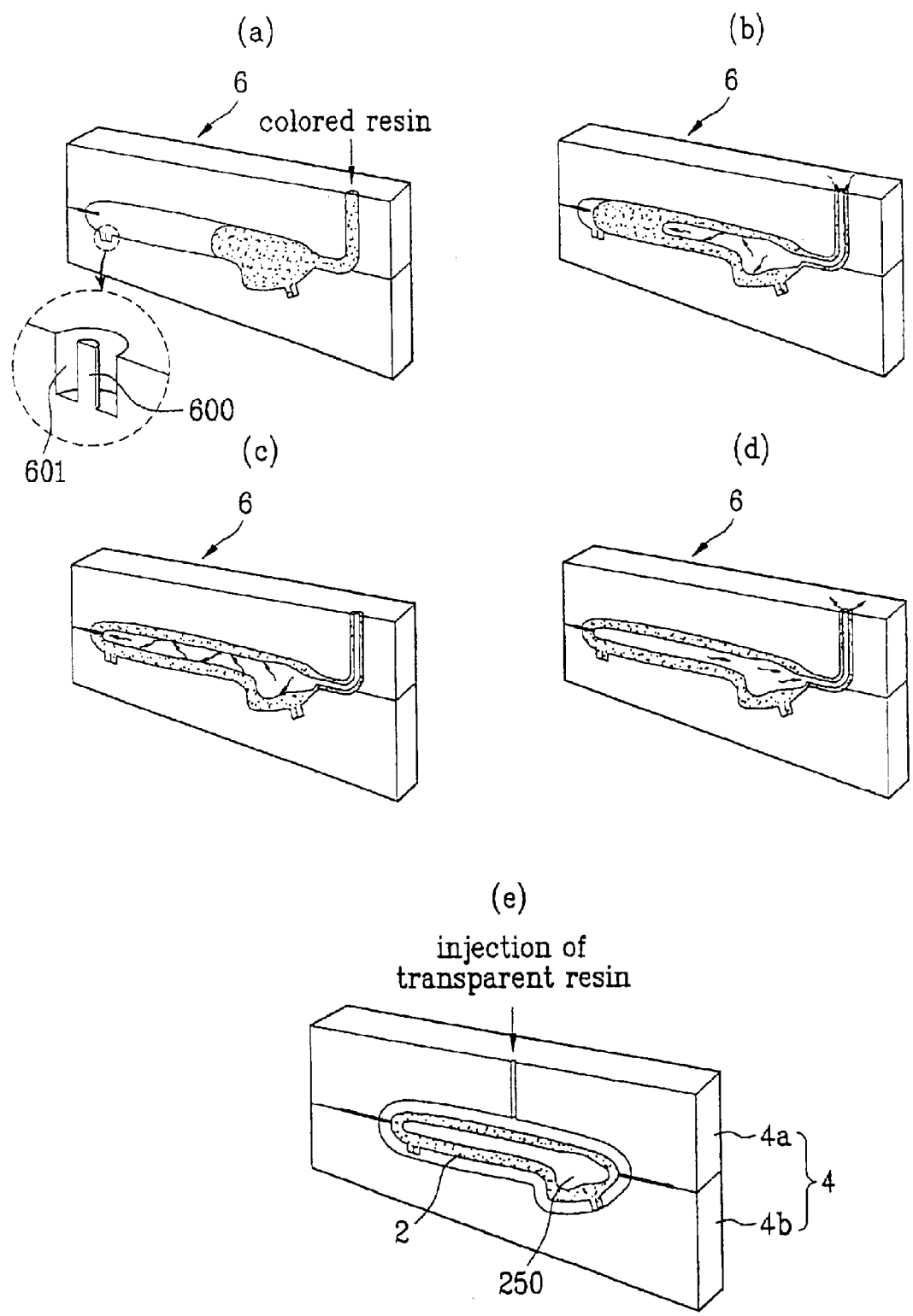
FIG. 22 is a conceptual view schematically showing the fabrication procedure of FIG. 21.

FIG. 2 is a perspective view showing one application example of a handgrip structure according to a third embodiment of the present invention, FIG. 18 is a plan view of a handgrip according to a third embodiment of the present invention, FIG. 19 is a bottom view of FIG. 18, and FIG. 20 is a longitudinal longitudinal sectional view taken along the line I—I of FIG. 18.

A handgrip 1 according to a third embodiment of the present invention includes a colored core 2 having a cavity therein and a coupling boss formed at both ends thereof, and a transparent shell 3 covering the core 2.

At this time, the core 2 is preferably made in a bar type. In case of the bar type core, it is more preferably that the core 2 has a predetermined curvature along a selected direction for an easy grip.

At least one of both ends of the core 2 is a streamline shape, and at least one of both ends of the shell 3 may be a streamline shape.

At least one end of the shell 3 may be a fan shape as it travels to both ends. Especially, a portion corresponding to both oblique sides of the fan shape is preferably inwardly curved for an easy grip.

In other words, in the fan shape structure of the shell 3, in case the portion corresponding to both oblique sides is inwardly curved, when looking at the grip of the handgrip according to the third embodiment of the present invention from the ergonomic point of view, the handgrip is well harmonized with shape of side palm as fisted and shape of thumb or middle finger, thereby making a role in increasing grip force for the handgrip 1 and helping to easily grip the handgrip 1.

Figure 23:
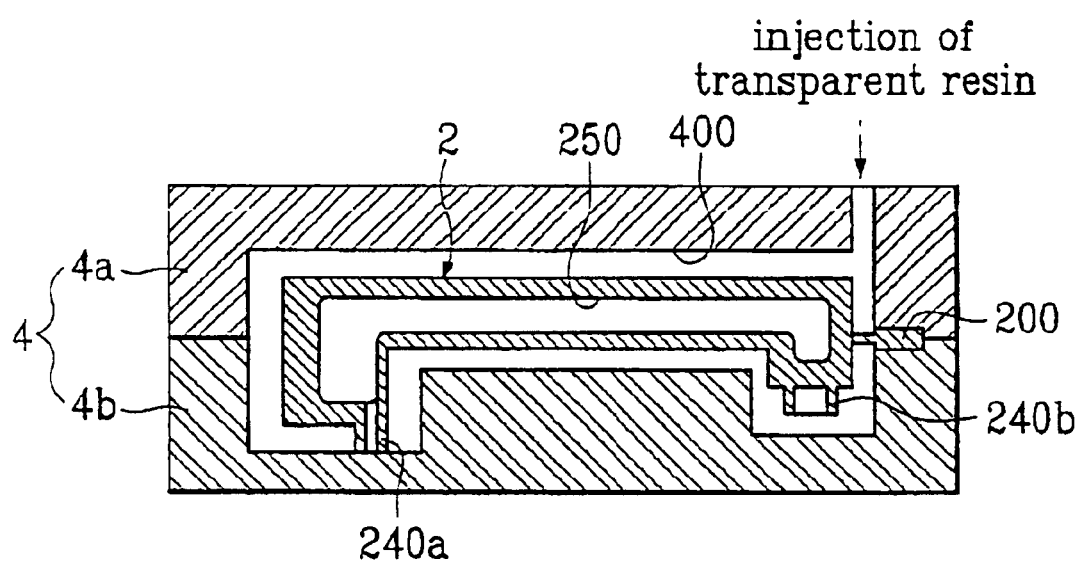
FIG. 23 is a schematic view showing a state in which a core is loaded into a mold.
Figure 24A:
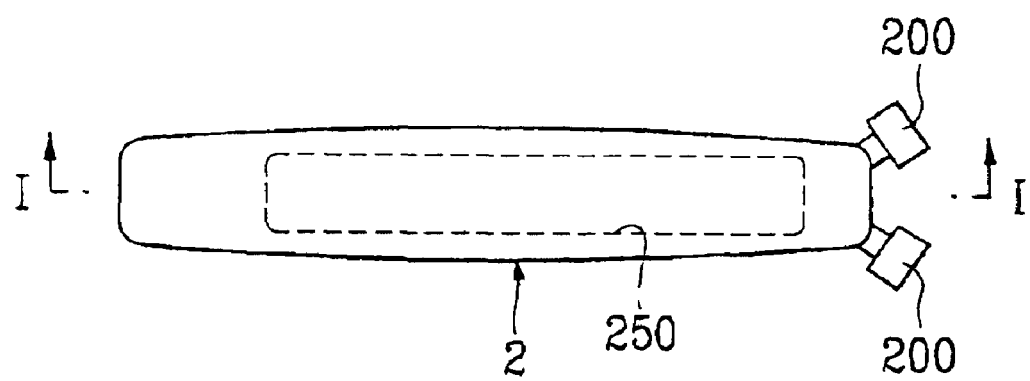
FIG. 24a is a plan view showing the core structure of FIG. 20.
Figure 24B:
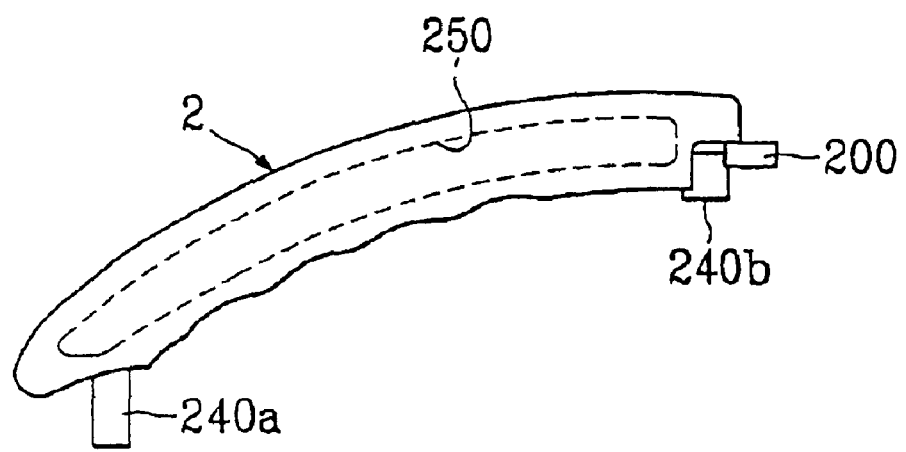

Meanwhile, FIG. 23 is a schematic view showing a state in which a core 2 having a clamping rib 200 formed at both ends is loaded into a mold, FIGS. 24a and 24b are respectively a plan view of the core shown in FIG. 23 and a front view. The core 2 includes the clamping rib 200 which when the core 2 is loaded into a mold for the formation of shell, allows the core to be supported by the mold. It is preferable that the clamping rib 200 is respectively provided at both ends of the core 2, in particular at a lower side of the both ends of the core 2 so as to be clamped between an upper mold 4a and a lower mold 4b.

Why the clamping rib 200 is provided at the lower side of the both ends of the core 2 is, in case of removing the clamping rib 200 after the formation of the shell, to get rid of the trace that the clamping rib 200 was placed.

Meanwhile, a metal layer may be formed on the surface of the core 2. At this time, the metal layer is formed by a plating method or a sputtering deposition.

Simultaneously, a color may be added to the shell 3 so as to maintain transparency of the shell 3 and beautify the appearance. In other words, the shell 3 may be formed from a transparent resin that has a color but does not weaken or harm the transparency and at the same time beautifies the appearance.

Preferably, the core 2 has a material property of which melting point is higher than that of the shell 3. More specifically, it is desirous that the melting point of the core 2 is 200° C. or more and the melting point of the shell 3 is below 150° C.

Also, the core is of a material having impact-resistant, high strength, high fluidity, high gloss and high plating-adhering strength. An example of the core material for satisfying such conditions includes Nylon, PC (Polycarbonate) or the like.

Meanwhile, the shell 3 is of a material having impact-resistant, high strength, high fluidity, fire retardancy, heat-resistant, chemical-resistant, corrosion-resistant and charging-preventing properties. In order to satisfy these conditions, the shell is of ABS, PMMA, Surlyn, ASA, ALPHALAC or the like.

A character or figure may be carved or relieved on the surface of the core 2.

Meanwhile, it may be desirous that the core 2 is heavy. In this case, the core 2 may be of metal.

Also, the lower surface of the shell 3 is formed in a concavo-convex structure having a dimple portion such that slip is prevented to thereby make it easy to grip the handgrip.

Further, according to the third embodiment of the invention, the coupling boss 240a, 240b functions to allow the handgrip to be screw-coupled with a door, a lid or the like.

A method for fabricating a handgrip having the above structure according to the third embodiment of the present invention is described with reference to FIGS. 21 to 24b.

First, in a state that a mold 6 for forming a core is prepared, a melted resin having a color is injected into the core forming mold 6. (Refer to "(a)" of FIG. 22) In other words, the core is formed by an injection molding that is a representative of plastic processing methods and is widely used in processing plastic products having a complicated shape.

At this time, the core forming mold 6 may be designed to be provided, at an outer side thereof when the core has been formed, with a clamping rib 200 that is clamped by a mold 4 for forming a shell, and with a coupling boss 240a, 240b that is coupled with a door or the like after the completion of the handgrip.

Meanwhile, after the injection of the melted resin into the cavity of the core forming mold 6 by a certain amount, a gas is injected into an interior of the melted resin to thereby expand the melted resin. (Refer to "(b) of FIG. 22)

Thereafter, the melted resin is cooled through an holding pressure process with preventing contraction of the resin. (Refer to "(c)" of FIG. 22) Thereafter, the gas is exhausted to complete the forming of the core having the hollow cavity for the handgrip. (Refer to "(d)" of FIG. 22)

Here, in order to enable to form the coupling boss 240a, 240b, a groove 600 for forming the boss is formed in a lower mold of the mold 6, and a rod-shaped rib 601 that after the mold 6 is removed, makes a coupling hole of the coupling boss 240a, 240b formed is provided at a center portion of the boss forming groove 600.

In the holding pressure process that is carried out as the next process to the injection process of the melted resin inside the mold, a specific pressure is applied to the injection inlet of the resin, and in this state, cooling of the filled material is carried out along with an additive introduction of the resin by the pressing, so that it becomes possible to minimize non-uniform contraction causing warpage of product.

Meanwhile, after the molded core 2 is extracted, the extracted core 2 is loaded into a shell forming mold 4 having a cavity 400 that is larger in volume than the core 2 and an insertion injection is carried out to complete a handgrip. (Refer to "(e)" of FIG. 22)

In other words, the clamping rib 200 formed at one end of the core 2 is clamped between an upper mold 4a and a lower mold 4b and at the same time the coupling boss 240a formed at the other end is in contact with inner surface of the lower mold 4b, and thus the core is supported, so that a space part is formed between the core 2 loaded into the shell forming mold 4 and the inner wall of the cavity 400 of the shell forming mold 4. After that, as above, after the core 2 has been loaded into the shell forming mold 4, the melted resin is injected into the cavity 400 of the shell forming mold 4 at a high speed and a high pressure, and after the completion of the injection, the injected transparent resin is cooled.

After the completion of the cooling, a handgrip including the core 2 and the shell 3 covering the core 2 is extracted from the shell forming mold 4.

Thereafter, the clamping rib 200 formed on the outer surface of the core 2 of the extracted handgrip is removed, so that only the core 2 and the shell 3 remain.

In other words, since the clamping rib 200 is formed at a lower side of one end of the core 2, when the handgrip from which the clamping rib 200 is removed is installed in a door or the like as shown in FIG. 2, a trace of the clamping rib 200 does not remain, so that appearance of the handgrip is beautified.

Also, after the completion of the forming of the core 2, prior to loading the core 2 into the shell forming mold 4, the step of carving or relieving a character or figure on the surface of the formed core 2 may be further included.

Separately, after the completion of the forming of the core 2, a metal layer may be formed on the surface of the core 2, which is formed by a plating or a sputtering deposition.

Further, the core 2 applied to the fabrication method of the handgrip according to the third embodiment of the present invention is made of a material of which melting point should be 200° C. or more and the melting point of the shell should be below 150° C.

Furthermore, the core 2 is preferably of a mater al having impact-resistant, high strength, high fluidity, high gloss and high plating-adhering strength properties. The material having the above properties of the core 2 includes Nylon and PC.

Moreover, the shell 3 is of a material having impact-resistant, high strength, high fluidity, fire retardancy, heat-resistant, chemical-resistant, corrosion-resistant and charging-preventing properties. The material having the above properties of the shell 3 includes ABS, PMMA, Surlyn, ASA and ALPHALAC.

According to the third embodiment of the present invention, the resin may be a transparent resin that has a color but does not weaken or harm the transparency and at the same time beautifies the appearance.

Hereinafter, a handgrip structure and a method for fabricating the same according to a fourth embodiment of the present invention are described with reference to FIG. 2 and FIGS. 25 to 29.

Figure 25:
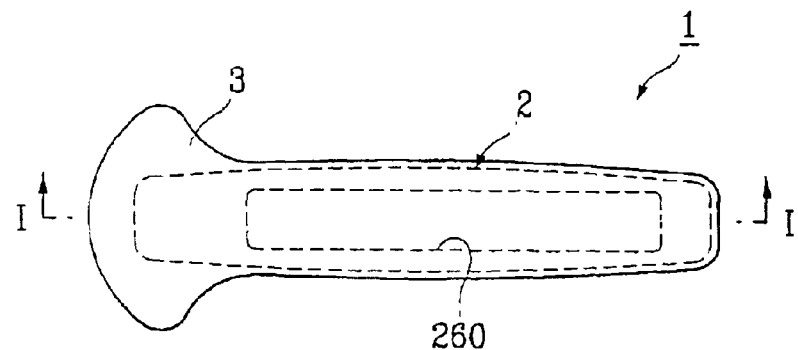
FIG. 25 is a plan view of a handgrip according to a fourth embodiment of the present invention.
Figure 26:
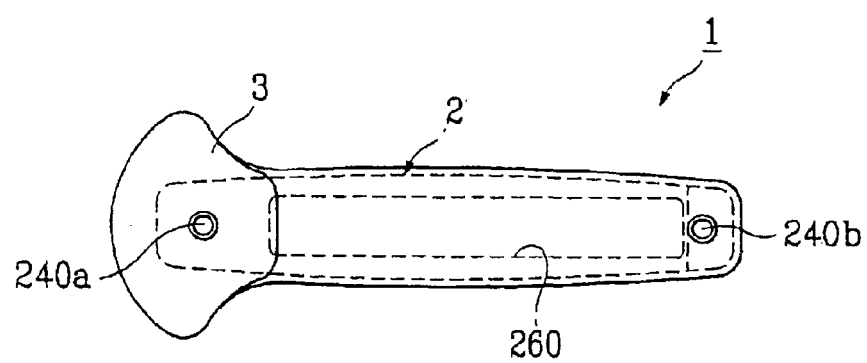
FIG. 26 is a bottom view of FIG. 25.
Figure 27:
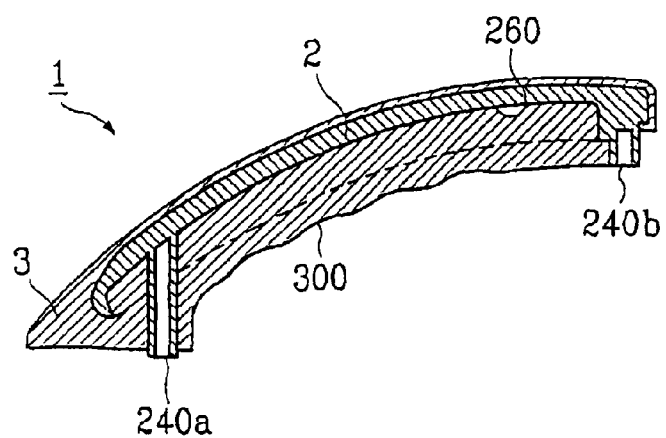
FIG. 27 is a longitudinal sectional view taken along the line I—I of FIG. 25.

FIG. 2 is a perspective view showing one application example of a handgrip structure according to a fourth embodiment of the present invention, FIG. 25 is a plan view of a handgrip according to a fourth embodiment of the present invention, FIG. 26 is a bottom view of FIG. 25, and FIG. 27 is a longitudinal sectional view taken along the line I—I of FIG. 25.

Figure 28:
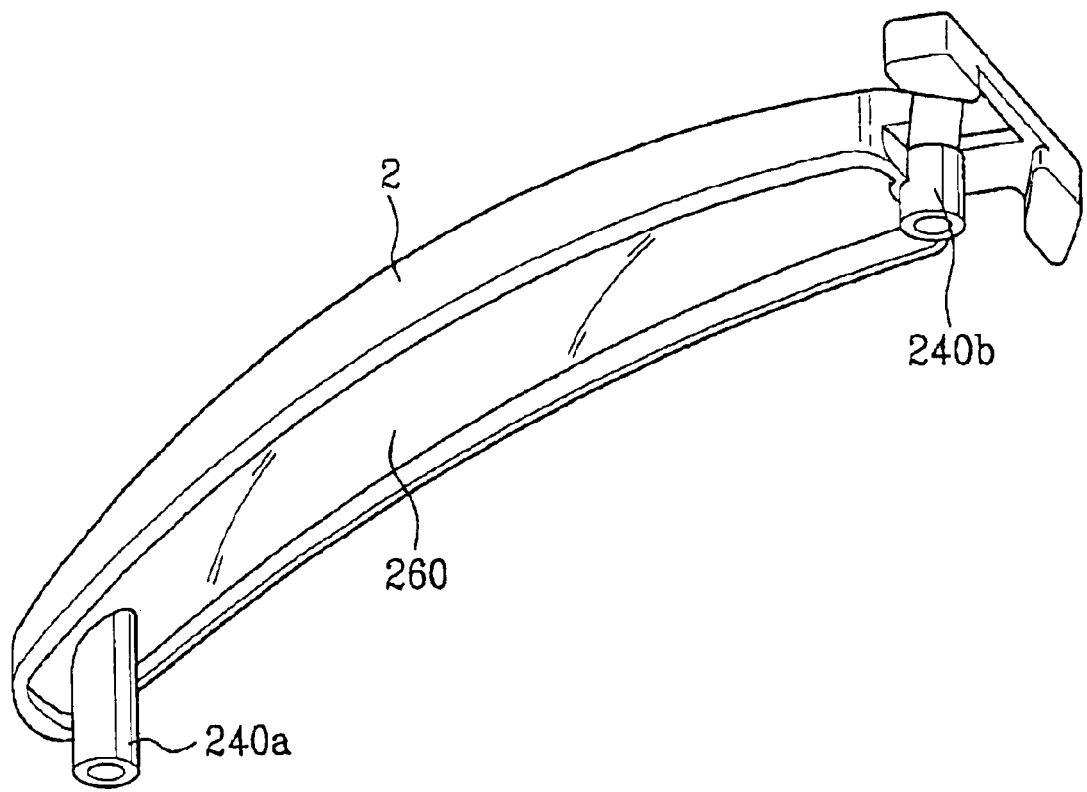
FIG. 28 is a perspective view of the core shown in FIG. 27.
Figure 29:
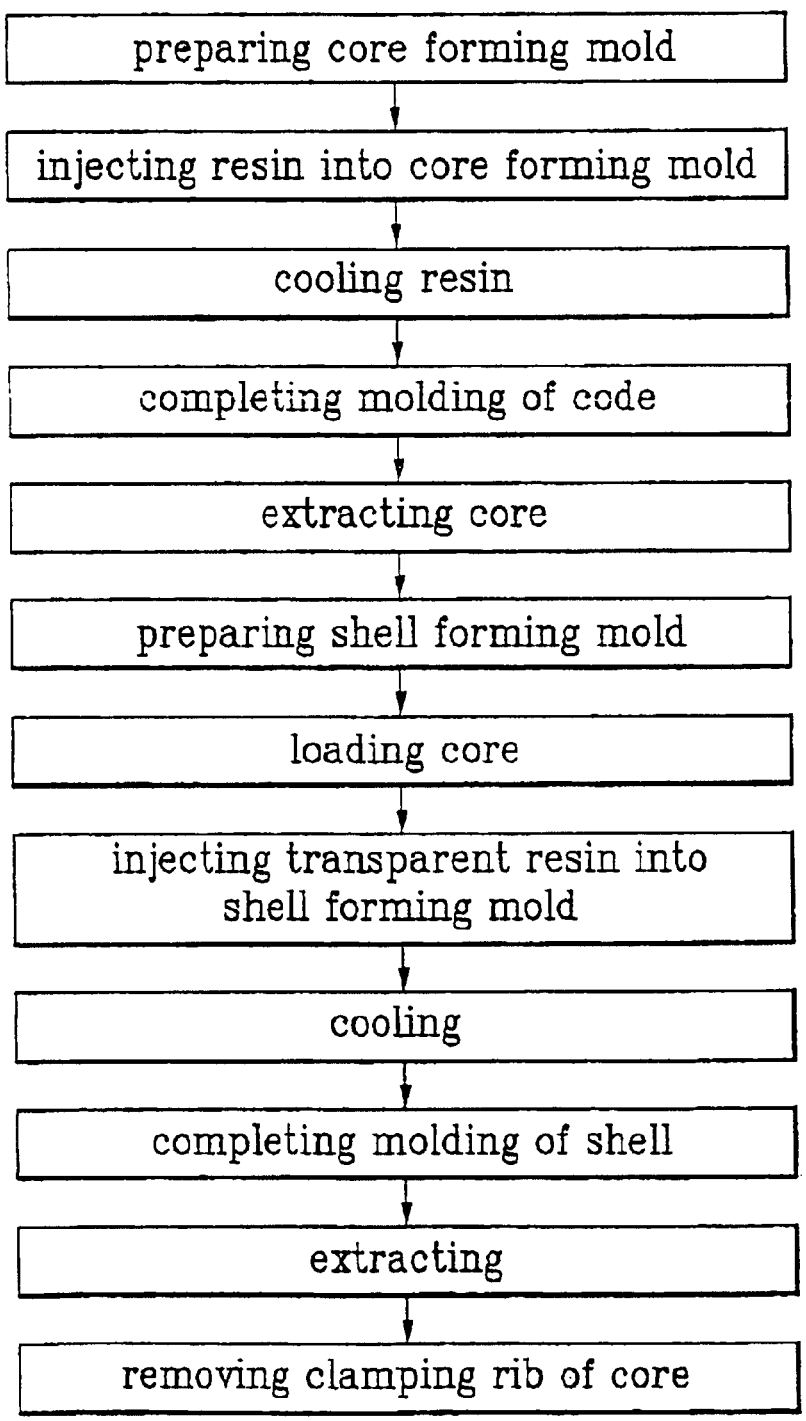
FIG. 29 is a flow chart showing a fabrication procedure according to a fourth embodiment of the present invention.

Also, FIG. 28 is a perspective view of the core shown in FIG. 27, and FIG. 29 is a flow chart showing a fabrication procedure according to a fourth embodiment of the present invention.

According to a fourth embodiment of the present invention, a handgrip 1 includes a colored core 2 having a concaved groove formed wholly along a length direction at a lower surface thereof and a coupling boss formed at both ends thereof, and a transparent shell 3 covering the core 2. Here, the core 2 is preferably made in a bar type. In case of the bar type core, it is more preferably that the core 2 has a predetermined curvature along a selected direction for an easy grip.

At least one of both ends of the core 2 is a streamline shape, and at least one of both ends of the shell 3 may be a streamline shape.

At least one end of the shell 3 may be a fan shape as it travels to both ends. Especially, a portion corresponding to both oblique sides of the fan shape is preferably inwardly curved for an easy grip.

In other words, in the fan shape structure of the shell 3, in case the portion corresponding to both oblique sides is inwardly curved, when looking at the grip of the handgrip according to the fourth embodiment of the present invention from the ergonomic point of view, the handgrip is well harmonized with shape of a side of the hand as fisted and shape of thumb or middle finger, thereby making a role in increasing grip force for the handgrip 1 and helping to easily grip the handgrip 1.

Meanwhile, the core 2 has a clamping rib 200 such that the core 2 is supported within a mold when the core is loaded into the mold to form the shell 3. The clamping rib 200 is provided at one end of the core 2 such that the clamping rib 200 is clamped between the lower mold and the upper mold, to support the core 2 along with the coupling boss 240a, 240b.

Why the clamping rib 200 is provided at the lower side of one end of the core 2 is, in case of removing the clamping rib 200 after the formation of the shell 3, to get rid of the trace that the clamping rib 200 was placed.

Meanwhile, a metal layer may be formed on the surface of the core 2. At this time, the metal layer is formed by a plating method or a sputtering deposition.

Simultaneously, a color may be added to the shell 3 so as to maintain transparency of the shell 3 and beautify the appearance. In other words, the shell 3 may be formed from a transparent resin that has a color but does not weaken or harm the transparency and at the same time beautifies the appearance.

Preferably, the core 2 has a material property of which melting point is higher than that of the shell 3. More specifically, it is desirous that the melting point of the core 2 is 200° C. or more and the melting point of the shell 3 is below 150° C.

Also, the core is of a material having impact-resistant, high strength, high fluidity, high gloss and high plating-adhering strength. An example of the core material for satisfying such conditions includes Nylon, PC (Polycarbonate) or the like.

Meanwhile, the shell 3 is of a material having impact-resistant, high strength, high fluidity, fire retardancy, heat-resistant, chemical-resistant, corrosion-resistant and charging-preventing properties. In order to satisfy these conditions, the shell is of ABS, PMMA, Surlyn, ASA, ALPHALAC or the like.

Also, character or figure may be carved or relieved on the surface of the core 2.

Also, the lower surface of the shell 3 is formed in a concavo-convex structure having a dimple portion such that slip is prevented to thereby make it easy to grip the handgrip.

According to the fourth embodiment of the invention, the coupling boss 240a, 240b formed at both ends during the molding of the core functions to allow the handgrip to be screw-coupled with a door, a lid or the like.

Hereinafter, a method for fabricating a handgrip having the above structure according to the fourth embodiment of the present invention is described as follows.

First, in a state that a mold 6 for forming a core is prepared, a melted resin having a color is injected into the core forming mold 6. In other words, the core is formed by an injection molding that is a representative of plastic processing methods and is widely used in processing plastic products having a complicated shape.

At this time, the core forming mold 6 may be designed to have at an outer side thereof when the core has been formed, a clamping rib 200 that is clamped by a mold for forming a shell, a coupling boss 240a, 240b that is coupled with a door or the like after the completion of the handgrip, and a concaved groove 260 below the coupling boss.

Here, in order to enable to form the coupling boss 240a, 240b, a groove for forming the boss is formed in a lower mold of the mold 6, and a rod-shaped rib that after the mold 6 is removed, makes a coupling hole of the coupling boss 240a, 240b formed is provided at a center portion of the boss forming groove.

Meanwhile, after the molded core 2 is extracted, the extracted core 2 is loaded into a shell forming mold 4 having a cavity 400 that is larger in volume than the core 2 and an insertion injection is carried out to complete a handgrip.

In other words, the clamping rib 200 formed at one end of the core 2 is clamped between an upper mold 4a and a lower mold 4b and at the same time the coupling boss 240a formed at the other end is in contact with inner surface of the lower mold 4b, and thus the core is supported, so that a space part is formed between the core 2 loaded into the shell forming mold 4 and the inner wall of the cavity 400 of the shell forming mold 4. After that, after the core 2 has been loaded into the shell forming mold, the melted resin is injected into the cavity of the shell forming mold at a high speed and a high pressure, and after the completion of the injection, the injected transparent resin is cooled.

After the completion of the cooling, a handgrip including the core 2 and the shell 3 covering the core 2 is extracted from the shell forming mold 4.

Thereafter, the clamping rib 200 formed on the outer surface of the core 2 of the extracted handgrip is removed, so that only the core 2 and the shell 3 remain.

In other words, since the clamping rib 200 is formed at a lower side of one end of the core 2, when the handgrip from which the clamping rib 200 is removed is installed in a door or the like as shown in FIG. 2, a trace of the clamping rib 200 does not remain, so that appearance of the handgrip is beautified.

Also, after the completion of the forming of the core 2, prior to loading the core 2 into the shell forming mold 4, the step of carving or relieving a character or figure on the surface of the formed core 2 may be further included.

Separately, after the completion of the forming of the core 2, a metal layer may be formed on the surface of the core 2, which is formed by a plating or a sputtering deposition.

Further, the core 2 applied to the fabrication method of the handgrip according to the fourth embodiment of the present invention is made of a material of which melting point should be 200° C. or more and the melting point of the shell should be below 150° C.

Furthermore, the core 2 is preferably of a material having impact-resistant, high strength, high fluidity, high gloss and high plating-adhering strength properties. The material having the above properties of the core 2 includes Nylon and PC.

Moreover, the shell 3 is of a material having impact-resistant, high strength, high fluidity, fire retardancy, heat-resistant, chemical-resistant, corrosion-resistant and charging-preventing properties. The material having the above properties of the shell 3 includes ABS, PMMA, Surlyn, ASA and ALPHALAC.

According to the fourth embodiment of the present invention, the resin may be a transparent resin that has a color but does not weaken or harm the transparency and at the same time beautifies the appearance.

Figure 30:
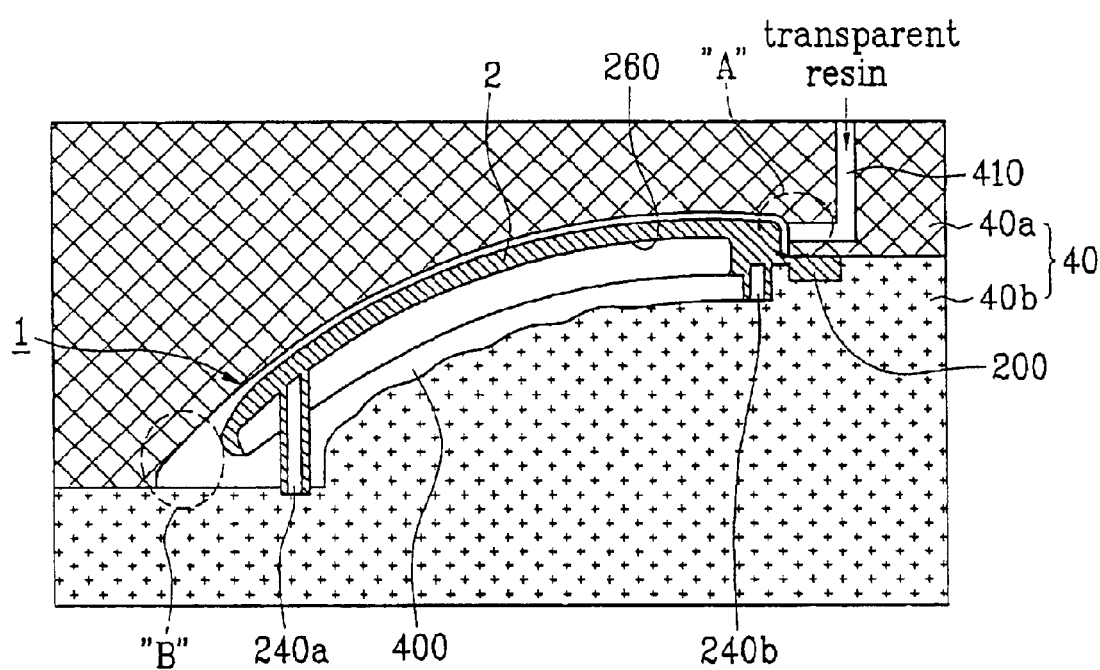
FIG. 30 is to illustrate a problem that may be generated in the fabricating methods of a handgrip, that have been applied prior to a method for fabricating a handgrip according to a fifth embodiment of the present invention, and is a sectional view showing a state in which the handgrip is loaded into a shell forming mold.

Meanwhile, FIG. 30 is to illustrate problems that may be generated in the fabricating methods of a handgrip according to the first to fourth embodiments, and in the aforementioned first to fourth embodiments, there have been provided new handgrip structures and methods for fabricating the same in which a problem in that coating peels off and a problem in that relieved or carved figure or character is damaged are solved, thereby capable of developing the beauty on appearance of the handgrip differentially from a conventional one.

However, according to the fabrication methods of the handgrips disclosed in the aforementioned respective embodiments, the following problems may be caused.

In other words, as shown in FIG. 30, in case of forming a shell 3 by injecting resin in a state where a molded core 2 is loaded into a shell forming mold 40, a gate for the injection of the resin is located over the shell forming mold

40, so that a thin leaf portion ("A" of FIG. 30) is first filled before a thick leaf portion ("B" of FIG. 30) located on the front of the shell 3 is filled. As a result, a time necessary in filling resin is lengthened, or a less-filling phenomenon occurs, and thus a weld line is formed on the shell 3, so that the appearance of the handgrip may be harmed.

Here, the thick leaf portion is indicative of the front portion of the fan shaped shell 3, which is thicker than other portions, and the thin leaf portion is indicative of the rear portion, which is thin in thickness of the shell 3. The weld line is indicative of a line shown on appearance, which is formed at a mid portion where the melted resin respectively fills left and right portions at different speeds starting from the thick leaf portion of the fan shape that is located at the rear side and again joins.

A fifth embodiment of the present invention is provided to solve the aforementioned problems. Accordingly, in the below, the fifth embodiment will be described in detail with reference to FIGS. 31 to 33.

Figure 31:
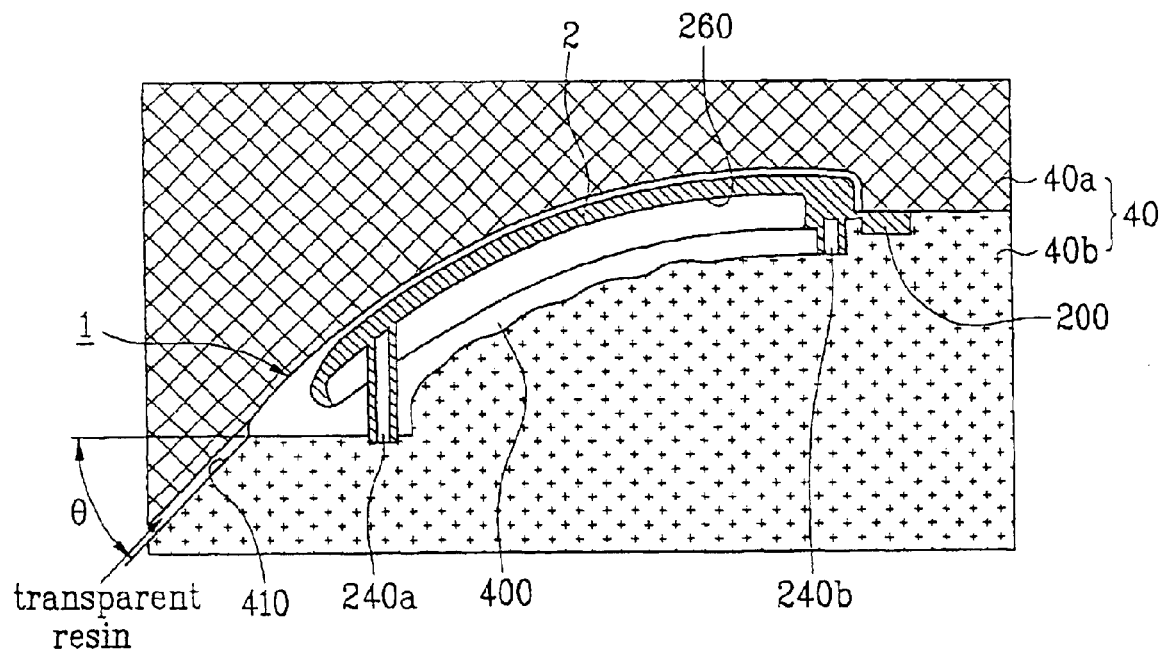
FIG. 31 is to illustrate a method for fabricating a handgrip according to a fifth embodiment of the present invention, and is a sectional view showing a state in which core is loaded into a shell forming mold.
Figure 32:
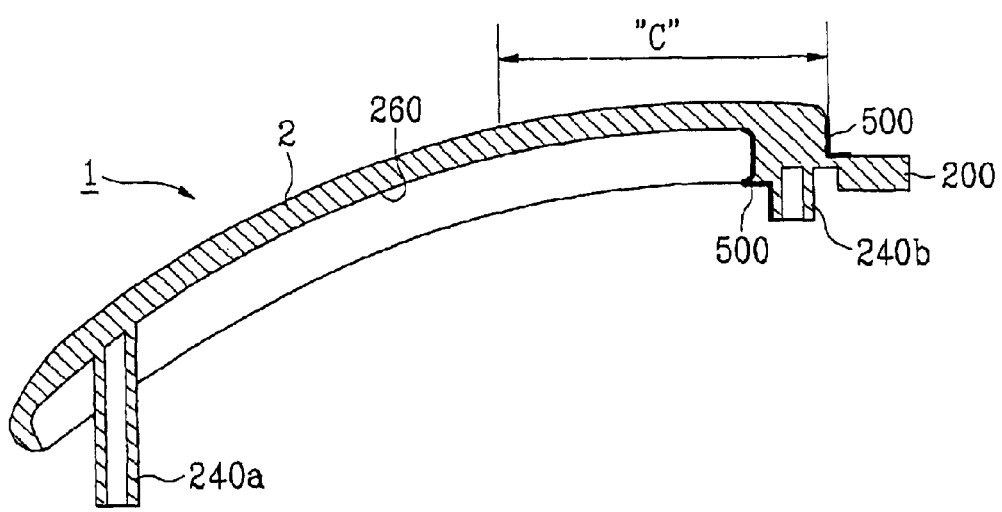
FIG. 32 is to illustrate a characteristic of the method according to the fifth embodiment, and is an exemplary sectional view of a masking region arranged on the surface of a core.
Figure 33:
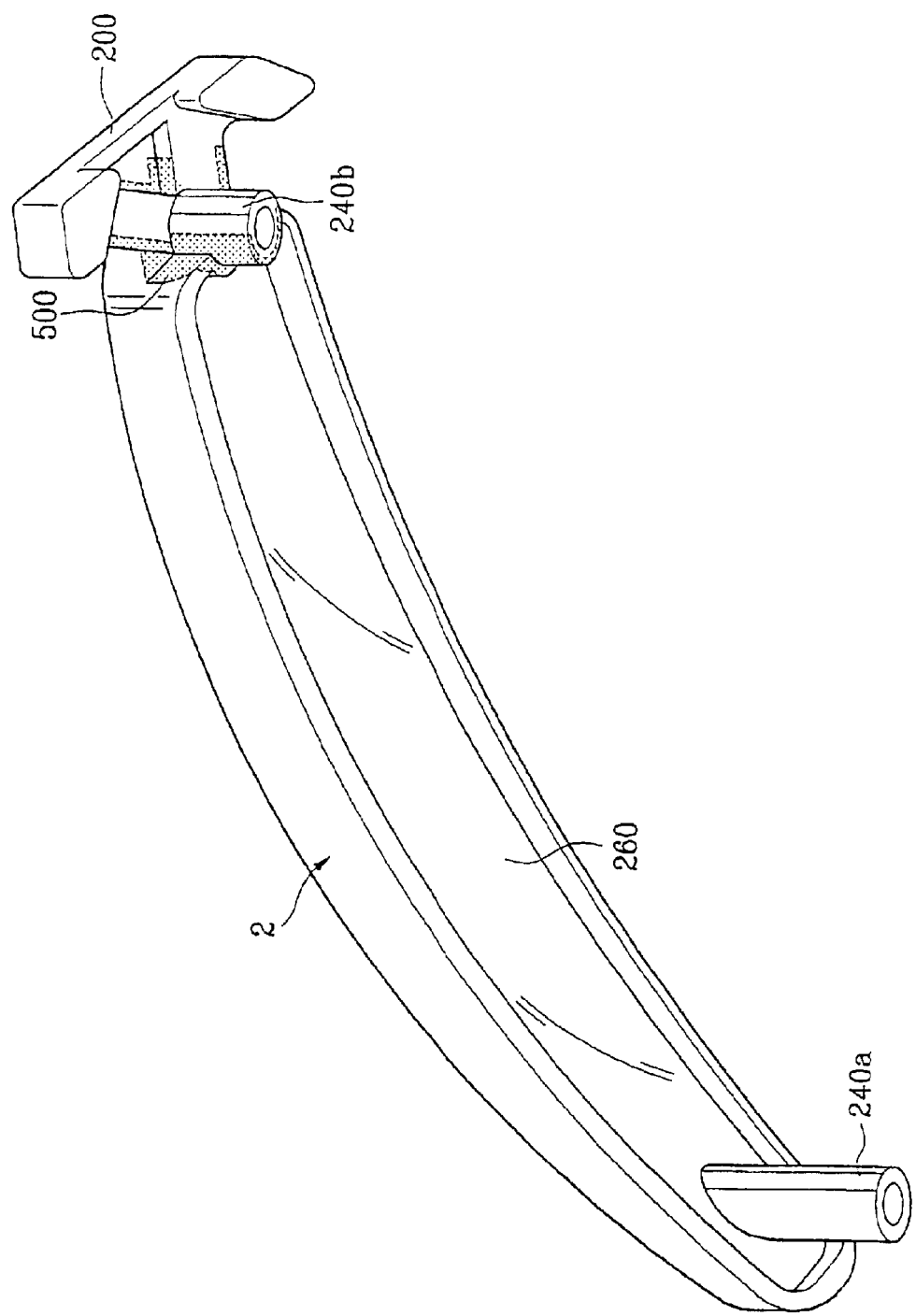
FIG. 33 is a bottom perspective view of a core, which shows the masking region of FIG. 32.

FIG. 31 is to illustrate a method for fabricating a handgrip according to a fifth embodiment of the present invention, and is a sectional view showing a state in which a core is loaded into a shell forming mold, FIG. 32 is to illustrate a characteristic of the fabrication method according to the fifth embodiment, and is an exemplary sectional view of a masking region arranged on the surface of the core, and FIG. 33 is a bottom perspective view of the core, which shows the masking region of FIG. 32.

According to a fifth embodiment of the invention, a handgrip 1 includes a core 2 and a transparent shell 3 covering the core 2.

Here, the core 2 has a predetermined curvature along a selected direction for an easy grip.

Also, a concaved groove 260 may be formed wholly along a length direction on the lower surface of the core 2, and a coupling boss 240a, 240b may be formed at both ends of the core 2.

At least one end of the shell 3 may be a fan shape as it travels to both ends.

Especially, a portion corresponding to both oblique sides of the fan shape is preferably inwardly curved for an easy grip.

In other words, in case the portion corresponding to both oblique sides in the fan shape of the shell 3 is inwardly curved, from the ergonomic point of view, the handgrip is well harmonized with shape of a side of the hand as fisted and shape of thumb or middle finger, thereby making a role in increasing grip force for the handgrip 1 and helping to easily grip the handgrip 1.

Meanwhile, a colored layer formed on the surface of the core 2 is of a colored metal layer. At this time, the colored metal layer is formed by a plating method or a sputtering deposition.

Simultaneously, a color may be added to the shell 3 so as to maintain transparency of the shell 3 and beautify the appearance. In other words, the shell 3 may be formed from a transparent resin that has a color but does not weaken or harm the transparency and at the same time beautifies the appearance.

Preferably, the core 2 has a material property of which melting point is higher than that of the shell 3. More specifically, it is desirous that the melting point of the core 2 is 200° C. or more and the melting point of the shell 3 is below 150° C.

Also, the core 2 is of a material having impact-resistant, high strength, high fluidity, high gloss and high plating-adhering strength. An example of the core material for satisfying such conditions includes Nylon, PC (Polycarbonate) or the like.

Meanwhile, the shell 3 is of a material having impact-resistant, high strength, high fluidity, fire retardancy, heat-resistant, chemical-resistant, corrosion-resistant and charging-preventing properties. In order to satisfy these conditions, the shell is of ABS, PMMA, Surlyn, ASA, ALDPHALAC or the like.

Also, character or figure may be carved or relieved on the surface of the core 2.

In addition, the lower surface of the shell 3 is formed in a concavo-convex structure having a dimple portion such that slip is prevented to thereby make it easy to grip the handgrip.

Further, the coupling boss 240a, 240b formed at both ends of the core 2 during the molding thereof functions to allow the handgrip 1 to be screw-coupled with a door, a lid or the like.

Meanwhile, the core forming mold may be designed to be provided, at an outer side thereof when the core has been formed, with a clamping rib 200 that is clamped by a mold 40 for forming a shell, and with a coupling boss 240a, 240b that is coupled with a door or the like after the completion of the handgrip, and at the lower surface of the core with a concaved groove 260.

Also, a gate 410 of the shell forming mold 40 is located at a position ("B" of FIG. 30) constituting the thick leaf portion after the formation of the shell.

At this time, the gate 410 is formed preferably declined by a predetermined angle (θ) with respect to a horizontal plane, and more preferably declined along a tangent direction drawn to pass through one end of the gate 410 and be in contact with an upper surface of the core 2.

Hereinafter, a method for fabricating a handgrip according to the fourth embodiment of the present invention is described as follows.

First, in a state that a mold (not shown) for forming a core is prepared, a melted resin having a color is injected into a cavity 400 of the core forming mold 6. In other words, the core is formed by an injection molding that is a representative of plastic processing methods and is widely used in processing plastic products having a complicated shape.

At this time, the core forming mold 6 may be designed to be provided, at an outer side thereof when the core has been formed, with a clamping rib 200 that is clamped by a mold for forming a shell, and a coupling boss 240a, 240b that is coupled with a door or the like after the completion of the handgrip, and with a concaved groove 260 on the lower surface of the core.

Here, in order to enable to form the coupling boss 240a, 240b, a groove for forming the boss is formed in a lower mold of the mold 6, and a rod-shaped rib (not shown) that after the mold 6 is removed, makes a coupling hole of the coupling boss 240a, 240b formed is provided at a center portion of the boss forming groove.

Meanwhile, after extracting the molded core 2, prior to loading the extracted core 2, a surface treatment for coloring a surface of the extracted core is carried out.

At this time, the surface treatment is carried out by covering a predetermined masking region of the core with a mask so as to define the predetermined masking region where a colored layer should not be formed, forming the colored layer at a portion other than the masking region 500 of the core 2, and removing the mask covered on the masking region 500.

Here, the colored layer formed on the surface of the core 2 is of a colored metal layer, which is formed by a plating or a sputtering deposition.

Meanwhile, the color surface-treated core is loaded into a shell forming mold 40 having a cavity 400 that is larger in volume than the core 2.

A gate 410 of the shell forming mold 40 is located at a position ("B" of FIG. 30) constituting the thick leaf portion after the formation of the shell, to be declined by a predetermined angle (θ) with respect to a horizontal plane.

Especially, the gate 410 of the shell forming mold 40 is preferably formed so as to accord with a tangent direction drawn to pass through one end of the gate 410 and be in contact with an upper surface of the core 2.

Why the gate 410 is formed declined by a predetermined angle (θ) with respect to a horizontal plane is that in case the gate 410 formed by coupling the upper mold 40a and the lower mold 40b is a structure directed toward the horizontal direction, as the resin is first filled in a lower space of the core 2 of the cavity 400, the pressure pushing the core 2 upward becomes larger than the pressure pushing the core downward, so that the core comes off and thus a deviation phenomenon from a fixed position may occur.

Thus, according to the fabrication method of the present embodiment, the resin injected through the gate 410 of the shell forming mold 40 first fills an upper portion of the core 2.

In other words, the filling of the resin is first carried out with respect to the upper side portion of the core 2, thereby preventing failure in the appearance of the core 2 due to the coming off of the core 2.

Meanwhile, the melted resin is injected through the gate 410 of the shell forming mold 40 at a high speed and a high pressure, and after the completion of the injection, the injected transparent resin is cooled. After the completion of the cooling, a handgrip including the core 2 and the shell 3 covering the core 2 is extracted from the shell forming mold 4.

Thereafter, the clamping rib 200 formed on the outer surface of the core 2 of the extracted handgrip is removed, so that only the core 2 and the shell 3 remain.

In other words, since the clamping rib 200 is formed at a lower side of one end of the core 2, when the handgrip from which the clamping rib 200 is removed is installed in a door or the like as shown in FIG. 2, a trace of the clamping rib 200 does not remain, so that appearance of the handgrip is beautified.

Meanwhile, in the aforementioned forming step of the shell 3, due to a lack of adhesive force between the color-treated surface of the core 2 and the shell 3, a space may be created between the core 2 and the shell 3. To this end, there may occur a problem in that when the handgrip is viewed from an outside, the shape and the color formed on the surface of the core 2 are visually distorted.

Along with this visual distortion problem, in case the adhesive force between the color-treated surface of the core 2 and the shell 3 is insufficient, moisture is penetrated into a space between the core 2 and the shell 3 during test of the handgrip products, such as the environment suitability test so that there may be a worry on the quality being lowered.

In the above, the lack phenomenon of the adhesive force between the treated surface of the core 2 and the shell 3 occurs when the temperature of the melted resin is lowered due to a low temperature of the mold 40 or a contact of the core surface with moisture or foreign particles. Especially, this non-adhesiveness phenomenon has a high occurrence possibility at the region "C" of FIG. 32.

Accordingly, the fifth embodiment of the invention does not perform the surface treatment for coloring a predetermined region on the surface of the core 2, thereby removing the lowering in the adhesive force between the surface of the core 2 and the shell 3.

In other words, since the adhesive force between the surface of the core 2 where the colored layer is not formed, and the shell 3 shows a superior characteristic compared with the adhesive force between the colored layer and the shell 3, a selected region of the surface of the core 2 is processed not to have the colored layer, so that an overall adhesive force between the core 2 and the shell 3 is increased through the direct adhesion of the surface of the core 2 and the shell 3, thereby preventing occurrence of a non-adhered portion.

For instance, in case the core 2 is of Nylon and the shell 3 is of Surlyn, the adhesive force therebetween is superior when they are directly adhered to each other. Accordingly, it is permitted not to form the colored layer at a portion where the colored layer is not necessary in the surface of the core 2, thereby no harming the sense of beauty on appearance and even preventing the occurrence of non-adhering portion between the core 2 of Nylon and the shell 3 of Surlyn.

At this time, as exemplarily shown in FIGS. 32 and 33, it is requested that the masking region where no surface treatment for the coloring is permitted preferably corresponds to an unexposed portion on appearance when installing the handgrip at door, lid or the like, but such a request is not essential. In other words, any portion other than the region shown in FIGS. 32 and 33, is possible if the portion corresponds to a contact portion with the resin during the forming process of the shell 3.

Meanwhile, prior to loading the molded core 2 into the shell forming mold 4, the step of carving or relieving a character or figure on the surface of the formed core 2 may be further included.

Simultaneously, the shell 3 may be formed from a transparent resin that has a color but does not weaken or harm the transparency and at the same time beautifies the appearance.

Further, the core 2 applied to the fabrication method of the handgrip according to the fifth embodiment of the present invention is made of a material of which melting point should be 200° C. or more and the melting point of the shell should be below 150° C.

Furthermore, the core 2 is preferably of a material having impact-resistant, high strength, high fluidity, high gloss and high plating-adhering strength properties, such as Nylon and PC.

Moreover, the shell 3 is of a material having impact-resistant, high strength, high fluidity, fire retardancy, heat-resistant, chemical-resistant, corrosion-resistant and charging-preventing properties, such as ABS, PMMA, Surlyn, ASA and ALPHALAC.

Meanwhile, after forming the shell 3, in case the shell 3 is a soft material, such as Surlyn or the like, a glossy wax is coated on a surface of the shell 3 for the prevention of scratch.

In other words, according to the conventional fabrication method of the handgrip, in case the shell 3 is a soft material such as Surlyn or the like, the soft shell is soft to the touch, but a high possibility in the occurrence of scratch exists in. 0.3

In this case, scratch may occur during the handling period of the handgrip products before the products are surveyed to consumers, thereby causing a problem in that the reliability is lowered.

So, the handgrip fabricated according to the present embodiment follows the step of removing a spot generated on the surface of the shell 3 due to a contact with water during the cooling process. In order to remove this spot, the aforementioned wax is used, thereby allowing the spot to be easily removed and simultaneously scratch to be prevented.

At this time, the glossy wax also functions to prevent penetration of moisture into the interior of the handgrip 1.

INDUSTRIAL APPLICABILITY

As described above, according to the present invention, a problem occurring at the conventional handgrip, e.g., a problems in that coating peels off or relieved or carved figure or character is damaged is solved, and it becomes possible to develop the beauty on appearance of the handgrip differentially from the conventional one.

In other words, the handgrip fabricated by the conventional method has the problems in that the coating peels off due to user's repeated usage or is decolored, but according to the respective embodiments of the present invention, these problems are solved.

Also, according to the respective embodiments, the handgrip of the present invention makes the shell protect character or figure relieved or carved on the core, so that an interference of the figure or character with other articles is excluded and accordingly there is solved a conventional problem in that the character or figure is lost due to the interference.

In addition, the coating surface of the conventional handgrip is weak in the contact with chemicals such as cosmetics, but the handgrips according to the first to fifth embodiments have the shell made of transparent resin having superior chemistry-resistant property or chemicals-resistant property, thereby solving the contact problems.

Further, in the handgrips according to the first to fifth embodiments of the invention, since the outer shell made of transparent resin covers the inner core, it provides sense to the touch different from the conventional handgrip, and particularly if the shell is made of a colored transparent resin, it becomes possible to realize handgrips having a variety of colors for users' preference.

Meanwhile, according to the respective embodiment of the invention, it is possible to lower the weight of the handgrip, thereby making it easy to handle the handgrip or door or lid to which the handgrip is coupled. In other words, the handgrip fabricated by the conventional method has the problems in that the weight is heavy, the coating peels off due to user's repeated usage or the coating is decolored after the elapse of long term, but according to the first to fifth embodiment of the invention, since the core of the handgrip is formed by the blow injection or the lower surface of the core is formed in a concaved form, the handgrip is light in weight, and since the shell is made of transparent resin, a phenomenon in that the coating peels off or decolored is prevented.

In addition, according to the fifth embodiment of the present invention, in performing the fabrication process of the handgrip including the colored core and the transparent shell, there are solved a phenomenon in that it takes a long time in filling the resin during the formation of the shell, a phenomenon in that resin is not completely filled, and a phenomenon in that a weld line is created.

In addition, according to the fifth embodiment of the present invention, there is solved a problem in that an adhesive force between core surface as treated and shell is insufficient and thus a space is created between the core and the shell.

Further, according to the fifth embodiment of the present invention, there is solved a scratch problem occurring when the handgrip products in which the shell is a soft material, are handled.

Accordingly, the present invention can be used valuably.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for fabricating a handgrip, said method comprising the steps of:

molding a colored core within a core forming mold, said core having a concaved groove formed wholly along a length direction at a lower surface thereof and a coupling boss formed at both ends thereof to be directed toward a lower direction having a cavity therein and a coupling boss formed at both ends thereof;

extracting the molded core;

covering a predetermined surface region of the core with a mask so as to define the predetermined surface region where a colored layer should not be formed;

forming the colored layer except for the predetermined surface region covered with the mask; and removing the mask performing a surface treatment for coloring a surface of the core;

loading the core into a shell forming mold having a cavity that is larger in volume than the core such that a gate of the shell forming mold is located at a position forming a thick leaf portion of a shell after forming the shell;

injecting a transparent resin into the cavity of the shell forming mold to form a shell covering the core; and extracting the handgrip comprised of the core and the shell from the shell forming mold.

2. A method for fabricating a handgrip, said method comprising the steps of:

molding a colored core within a core forming mold, said core having a concaved groove formed wholly along a length direction at a lower surface thereof and a coupling boss formed at both ends thereof to be directed toward a lower direction having a cavity therein and a coupling boss formed at both ends thereof;

extracting the molded core;

performing a surface treatment for coloring a surface of the core;

loading the core into a shell forming mold having a cavity that is larger in volume than the core such that a gate of the shell forming mold is located at a position forming a thick leaf portion of a shell after forming the shell;

injecting a transparent resin into the cavity of the shell forming mold to form a shell covering the core; and extracting the handgrip comprised of the core and the shell from the shell forming mold.

3. The method of claim 2, wherein said core contains at least one of Nylon and PC.

4. The method of claim 2, wherein said shell comprises at least one selected from a group consisting of ABS, PMMA, Surlyn, ASA and ALPHALAC.

5. The method of claim 2, wherein the gate of the shell forming mold is formed declined by a predetermined angle with respect to a horizontal plane.

6. The method of claim 5, wherein the gate of the shell forming mold is declined along a tangent direction drawn to pass through one end of the gate and be in contact with an upper surface of the core.

7. The method of claim 2, wherein before the molded core is loaded into the shell forming mold, the core is subject to a surface treatment for coloring the surface of the core.

8. The method of claim 7, wherein the surface treatment comprises the steps of:

covering a predetermined region of the core with a mask so as to define the predetermined region where a colored layer should not be formed;

forming the colored layer except for the predetermined region covered with the mask; and removing the mask.

9. The method of claim 7, wherein the colored layer is a metal layer.

10. The method of claim 9, wherein the metal layer is formed by a plating process or a sputtering process.

11. The method of claim 8, wherein the region covered with the mask corresponds to an unexposed region on appearance when the handgrip is installed in a door, a lid or the like and simultaneously to a region in contact with the resin during the molding step.

12. The method of claim 2, if the shell is a soft material after forming the shell, further comprising the step of coating a glossy wax on a surface of the shell.

13. The method of claim 12, wherein the shell is Surlyn.

14. A method for fabricating a handgrip, said method comprising the steps of molding a core having a predetermined curvature; loading the core into a shell forming mold having a cavity that is larger in volume than the core, wherein before the molded core is loaded into the shell forming mold, the core is subject to a surface treatment that colors the surface of the core; and injecting a transparent resin into the cavity of the shell forming mold to form a shell covering the core thereby forming the handgrip;

wherein a gate of the shell forming mold is located prior to performing the step of forming the shell at a position forming a thick leaf portion after completion of the forming of the shell.

15. The method of claim 14, wherein said core comprises a clamping rib formed at one end thereof, said clamping rib is, when the core is loaded into a shell forming mold, clamped by the shell forming mold to support the core.

16. The method of claim 14, wherein said core contains at least one of Nylon and PC.

17. The method of claim 14, wherein said shell comprises at least one selected from a group consisting of ABS, PMMA, Surlyn, ASA and ALPHALAC.

18. The method of claim 14, wherein the gate of the shell forming mold is formed declined by a predetermined angle with respect to a horizontal plane.

19. The method of claim 18, wherein the gate of the shell forming mold is declined along a tangent direction drawn to pass through one end of the gate and be in contact with an upper surface of the core.

20. The method of claim 14, wherein the surface treatment comprises the steps of:

covering a predetermined region of the core with a mask so as to define the predetermined region where a colored layer should not be formed;

forming the colored layer except for the predetermined region covered with the mask; and removing the mask.

21. The method of claim 20, wherein the colored layer is a metal layer.

22. The method of claim 21, wherein the metal layer is formed by a plating process or a sputtering process.

23. The method of claim 20, wherein the region covered with the mask corresponds to an unexposed region on appearance when the handgrip is installed in a door or a lid and simultaneously to a region in contact with the resin during the molding step.

24. The method of claim 14, if the shell is a soft material after forming the shell, further comprising the step of coating a glossy wax on a surface of the shell.

25. The method of claim 24, wherein the shell is Surlyn.

* * * * *